US009524081B2

(12) United States Patent
Keane et al.

(10) Patent No.: US 9,524,081 B2
(45) Date of Patent: Dec. 20, 2016

(54) SYNCHRONIZING VIRTUAL ACTOR'S PERFORMANCES TO A SPEAKER'S VOICE

(71) Applicant: Microsoft Technology Licensing, LLC, Redmond, WA (US)

(72) Inventors: Brian E. Keane, Bellevue, WA (US); Ben J. Sugden, Woodinville, WA (US); Robert L. Crocco, Jr., Seattle, WA (US); Christopher E. Miles, San Francisco, CA (US); Kathryn Stone Perez, Kirkland, WA (US); Laura K. Massey, Redmond, WA (US); Mathew J. Lamb, Mercer Island, WA (US); Alex Aben-Athar Kipman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 31 days.

(21) Appl. No.: 14/687,877

(22) Filed: Apr. 15, 2015

(65) Prior Publication Data

US 2015/0220231 A1   Aug. 6, 2015

Related U.S. Application Data

(63) Continuation of application No. 13/473,268, filed on May 16, 2012, now Pat. No. 9,035,955.

(51) Int. Cl.
*G06F 3/0483* (2013.01)
*G10L 21/10* (2013.01)
(Continued)

(52) U.S. Cl.
CPC .............. *G06F 3/0483* (2013.01); *G06F 3/011* (2013.01); *G06F 3/1415* (2013.01);
(Continued)

(58) Field of Classification Search
None
See application file for complete search history.

(56) References Cited

U.S. PATENT DOCUMENTS

| 3,975,080 A | 8/1976 | Norman |
| 6,181,351 B1 | 1/2001 | Merrill |

(Continued)

FOREIGN PATENT DOCUMENTS

| AU | 2011204946 | * 7/2011 | ............. G06T 15/50 |
| WO | WO2008/031955 | 3/2008 | |

OTHER PUBLICATIONS

Behringer, R., Chen, S., Sundareswaran, K., Wang, K., Vassiliou, M., A Novel Interface for Device Diagnostics Using Speech Recognition, Augmented Reality Visualization, and 3D Audio Auralization, 1999, ICMCS '99 IEEE, vol. 2, pp. 427-432.*

(Continued)

*Primary Examiner* — Said Broome
(74) *Attorney, Agent, or Firm* — Sandy Swain; Judy Yee; Micky Minhas

(57) ABSTRACT

A system for generating and displaying holographic visual aids associated with a story to an end user of a head-mounted display device while the end user is reading the story or perceiving the story being read aloud is described. The story may be embodied within a reading object (e.g., a book) in which words of the story may be displayed to the end user. The holographic visual aids may include a predefined character animation that is synchronized to a portion of the story corresponding with the character being animated. A reading pace of a portion of the story may be used to control the playback speed of the predefined character animation in real-time such that the character is perceived to be lip-syncing the story being read aloud. In some cases, an (Continued)

existing book without predetermined AR tags may be augmented with holographic visual aids.

20 Claims, 20 Drawing Sheets

(51) Int. Cl.
| | |
|---|---|
| G06F 3/01 | (2006.01) |
| G06T 19/00 | (2011.01) |
| G06F 3/14 | (2006.01) |
| G10L 15/26 | (2006.01) |
| G10L 25/03 | (2013.01) |
| G09B 5/06 | (2006.01) |
| G03H 1/22 | (2006.01) |

(52) U.S. Cl.
CPC .......... *G06T 19/006* (2013.01); *G10L 21/10* (2013.01); *G03H 1/2294* (2013.01); *G03H 2001/2284* (2013.01); *G03H 2227/02* (2013.01); *G03H 2270/55* (2013.01); *G09B 5/062* (2013.01); *G10L 15/26* (2013.01); *G10L 25/03* (2013.01); *G10L 2021/105* (2013.01)

(56) References Cited

U.S. PATENT DOCUMENTS

| | | |
|---|---|---|
| 6,250,928 B1 | 6/2001 | Poggio |
| 6,429,867 B1 | 8/2002 | Deering |
| 6,772,122 B2 | 8/2004 | Jowitt |
| 7,050,078 B2 | 5/2006 | Dempski |
| 7,164,076 B2 | 1/2007 | McHale |
| 7,613,613 B2 | 11/2009 | Fields |
| 7,783,077 B2 | 8/2010 | Miklos |
| 7,847,699 B2 | 12/2010 | Lee |
| 2003/0012410 A1 | 1/2003 | Navab |
| 2003/0110026 A1 | 6/2003 | Yamamoto |
| 2009/0196459 A1 | 8/2009 | Watt |
| 2009/0235162 A1 | 9/2009 | Nuccio |
| 2010/0060662 A1 | 3/2010 | Law |
| 2010/0100851 A1 | 4/2010 | Clark |
| 2010/0149609 A1 | 6/2010 | Schwerdtner |
| 2010/0253700 A1 | 10/2010 | Bergeron |
| 2010/0257252 A1 | 10/2010 | Dougherty |
| 2010/0259538 A1 | 10/2010 | Park |
| 2011/0126140 A1 | 5/2011 | Danilov |
| 2011/0157667 A1 | 6/2011 | Lacoste |
| 2011/0216060 A1 | 9/2011 | Weising |
| 2012/0001923 A1 | 1/2012 | Weinzimmer |
| 2012/0218301 A1 | 8/2012 | Miller |
| 2013/0076788 A1 | 3/2013 | Ben Zvi |

OTHER PUBLICATIONS

Office Action dated Mar. 27, 2015, U.S. Appl. No. 13/473,241.
Autodesk Inc., "Face Robot—What is That?", Available at http://softimage.wiki.softimage.com/index.pho?title=Face_Robot_-_What_is_That%3F.
Baldassari, et al., "An Open Source Engine for Embodied Animated Agents", In Proceedings of Congreso Espanol de Informatica Grafica, 2007, pp. 89-98.
Desbiens, Jacques, "Experiments in image Composition for Synthetic Holography" In Proceedings of the 8th International Symposium on Display Holography, Jul. 13, 2009, pp. 1-9.
Ercan, et al., "On Sensor Fusion for Head Tracking in Augmented Reality Applications", In American Control Conference, Jun. 29, 2011, pp. 1286-1291.
Friedland, et al., "Text Book on Fundamentals of Multimedia Computing", Retrieved on: Feb. 14, 2012, Available at: http://mmcreole.wikispaces.com/file/view/Chapter_Centext_and_Content_100804.pdf.
Gould, et al., "Integrating Visual and Range Data for Robotic Object Defection", In ECCV Workshop on Multi-camera and Multi-modal Sensor Fusion Algorithms and Applications (M2SFA2), Oct. 18, 2008, pp. 434-455.
Guo, et al., "Sixth-Sense: Context Reasoning for Potential Objects Detection in Smart Sensor Rich Environment", In Proceedings of the IEEE/WIC/ACM International Conference on Intelligent Agent Technology, Dec. 18, 2006, pp. 191-194.
Hoiem, et al., "3D LayoutCRF for Multi-View Object Class Recognition and Segmentation", In Proceedings of the IEEE Conference on Computer Vision and Pattern Recognition, Jun. 17, 2007, pp. 1-8.
Martin, et al., "Evaluation of Holographic Technology in Close Air Support Mission Planning and Execution", Published on: Jun. 2008, Available at:http://www.dtic.mit/cgi-bin/GetTRDoc?AD=ADA486177.
Nakamura, et al., "A Method for Estimating Position and Orientation with a Topological Approach using Multiple Infrared Tags", In Proceedings of Fourth International Conference on Networked Sensing Systems, Jun. 6, 2002, pp. 187-195.
Reallusion, "Crazy Talk 6 (PC DVD)", Published on: Apr. 12, 2010, Available at: http://www.amazon.co.uk/Crazy-Talk-6-PC-DVD/dp/B002DUCNL4.
Samzenpus, ""Holographic" Desk Allows Interaction with Virtual Objects", Published on: Oct. 26, 2011, Available at http://tech.slashdot.org/story/11/10/26/1725214/holographic-desk-allows-interaction-with-virtual-objects.
Stone, et al., "Speaking with Hands: Creating Animated Conversational Characters from Recordings of Human Performance", In Proceedings of ACM SIGGRAPH, Aug. 8, 2004, pp. 506-513.
Straczynski, J. Michael, "The Great Maker: (JMS) at San Diego Comic Con '95", Retrieved on: Feb. 13, 2012; Available at:http://ubots.com/b5/jms_on_b5.shtml.
Tanaka et al., "Toward Automatic Construction of Reality-based Virtual Space Simulation", In Proceedings of 12th International Conference on Artificial Reality and Telexistence, Dec. 4, 2002, 6 pages.
Tsiatsis, et al., "Poster Abstract: On the Interaction of Network Characteristics and Collaborative Target Tracking in Sensor Networks", In Proceedings of the 1st International Conference on Embedded Networked Sensor Systems, Nov. 5, 2003, pp. 316-317.
Voice-O-Matic, 2000, www.di-o-matic.com/products/plugins/VoiceOMatic/#page=overview.
Xu, et al., "Computer-Generated Holography for Dynamic Display of 3D Objects with Full Parallax", The International Journal of Virtual Reality, Jun. 2009, pp. 33-38.
Ziegler, et al., "A Framework for Holographic Scene Representation and Image Synthesis", In Proceedings of the IEEE Transactions on Visualization and Computer Graphics, vol. 13, Issue 2, Mar. 2007, pp. 403-415.
PCT International Search Report dated Sep. 24, 2013, PCT Patent Application No. PCT/US2013/041262.
PCT Written Opinion of the International Searching Authority dated Sep. 24, 2013, PCT Patent Application No. PCT/US2013/041262.
PCT International Search Report dated Sep. 13, 2013, PCT Patent Application No. PCT/US2013/041257.
PCT Written Opinion of the International Searching Authority dated Sep. 13, 2013, PCT Patent Application No. PCT/US2013/041257.
Wagner, "How real should virtual characters be?," Proceedings of the 2006 ACM SIGCHI International Conference on Advances in Computer Entertainment Technology, ACE '06, Jun. 14, 2006.
Billinghurst, "The MagicBook: a transitional AR interface," Computers and Graphics, Elsevier, GB, vol. 25, No. 5, Oct. 1, 2001.
Office Action dated May 1, 2014, U.S. Appl. No. 13/473,241.
Response to Office Action dated Aug. 1, 2014, U.S. Appl. No. 13/473,241.
Office Action dated Sep. 3, 2014, U.S. Appl. No. 13/473,241.
Response to Office Action dated Jan. 5, 2015, U.S. Appl. No. 13/473,241.
*Office Action dated Aug. 4, 2014, U.S. Appl. No. 13/473,268.
*Response to Office Action dated Nov. 21, 2014, U.S. Appl. No. 13/473,268.

(56) References Cited

OTHER PUBLICATIONS

*Notice of Allowance dated Feb. 9, 2015, U.S. Appl. No. 13/473,268.
*Behringer, A Novel Interface for Device Diagnostics Using Speech Recognition, Augmented Reality Visualization, and 3D Audio Auralization, 1999, ICMCS '99 IEEE, vol. 2, pp. 427-432.
U.S. Appl. No. 13/152,220, filed Jun. 2, 2011.
U.S. Appl. No. 13/275,190, filed Oct. 17, 2011.
U.S. Appl. No. 13/538,706, filed Jun. 29, 2012.
U.S. Appl. No. 13/473,241, filed May 16, 2012.
U.S. Appl. No. 13/538,829, filed Jun. 29, 2012.
U.S. Appl. No. 13/538,848, filed Jun. 29, 2012.
U.S. Appl. No. 13/313,368.
U.S. Appl. No. 13/347,576.
Axelsson, et al., "Real Time Speech Driven Face Animation," Master Thesis at the Image Coding Group, Dept. of Electrical Engineering at Linkoping University, 2003.
Visage/SDK 5.4, The Face Animation Company, Visage Technologies AB, 2004.
Zoric, "Automatic Lip Synchronization by Speech Signal Analysis;" University of Zagreb, 2005.
Response to Office Action dated Jun. 29, 2015, U.S. Appl. No. 13/473,241.
Office Action dated Sep. 11, 2015, U.S. Appl. No. 13/473,241.

* cited by examiner

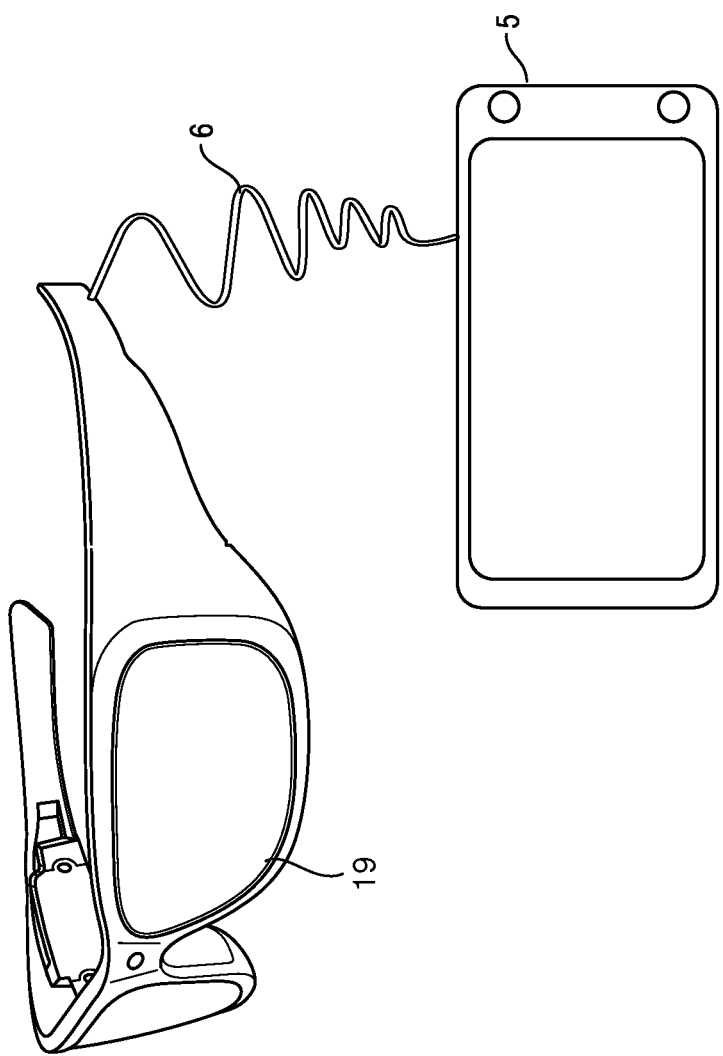

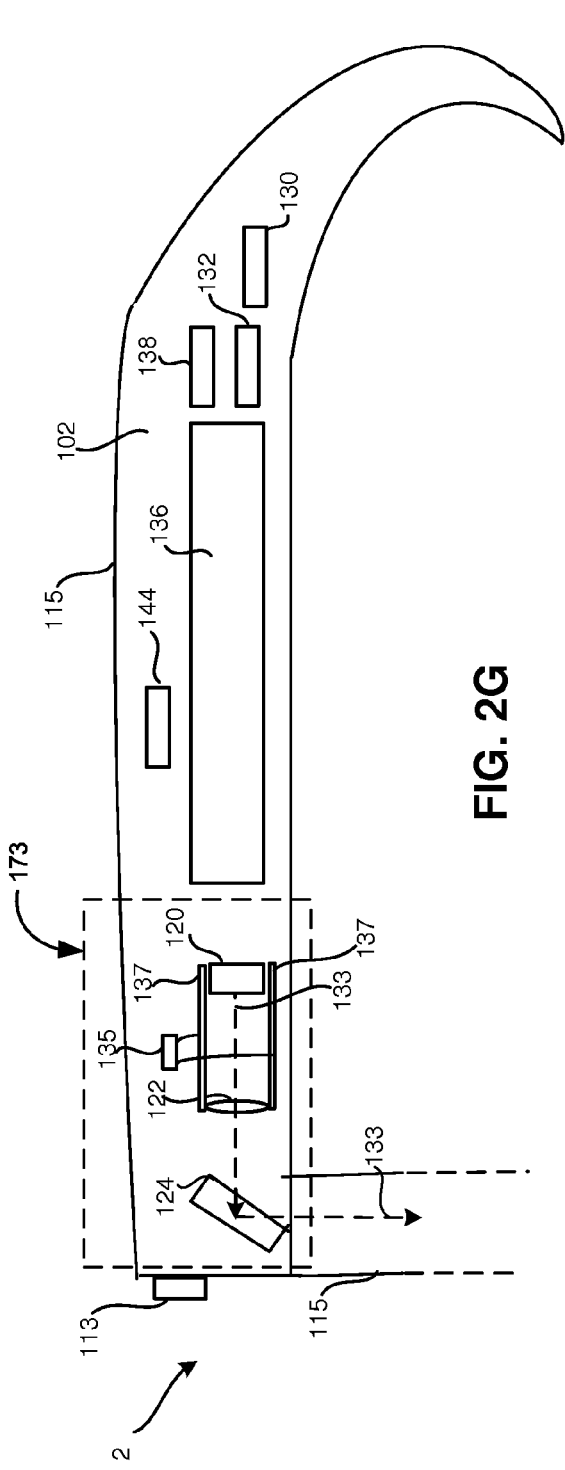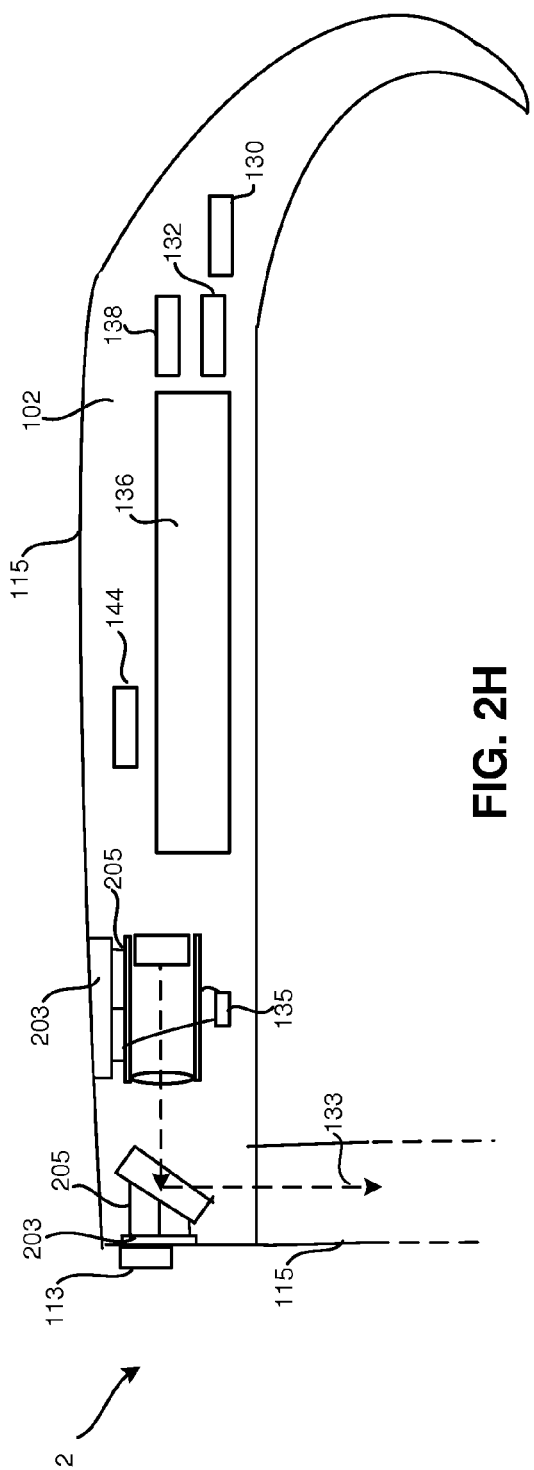

SYNCHRONIZING VIRTUAL ACTOR'S PERFORMANCES TO A SPEAKER'S VOICE

CLAIM OF PRIORITY

The present application is a continuation of and claims priority to U.S. patent application Ser. No. 13/473,268, entitled "Synchronizing Virtual Actor's Performances to a Speaker's Voice," filed May 16, 2012, which is herein incorporated by reference in its entirety.

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several steps including mapping and localization. Mapping relates to the process of generating a map of a real-world environment. Localization relates to the process of locating a particular point of view or pose relative to the map of the real-world environment. A fundamental requirement of many AR systems is the ability to localize the pose of a mobile device moving within a real-world environment in real-time in order to determine the particular view associated with the mobile device that needs to be augmented as the mobile devices moves within the real-world environment.

SUMMARY

Technology is described for generating and displaying holographic visual aids associated with a story to an end user of a head-mounted display device (HMD) while the end user is perceiving the story being read aloud. The story may be embodied within a reading object (e.g., a real or virtual book) in which words of the story may be displayed. The holographic visual aids may include a predefined character animation that is synchronized to a portion of the story corresponding with a character being animated. A reading pace of a portion of the story may be used to control the playback speed of the predefined character animation in real-time such that the character is perceived to be lip-syncing the story being read aloud.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A depicts one embodiment of a mobile device in communication with a second mobile device.

FIG. 2G depicts one embodiment of a side view of a portion of an HMD.

FIG. 2H depicts one embodiment of a side view of a portion of an HMD which provides support for a three dimensional adjustment of a microdisplay assembly.

DETAILED DESCRIPTION

Figure 1:
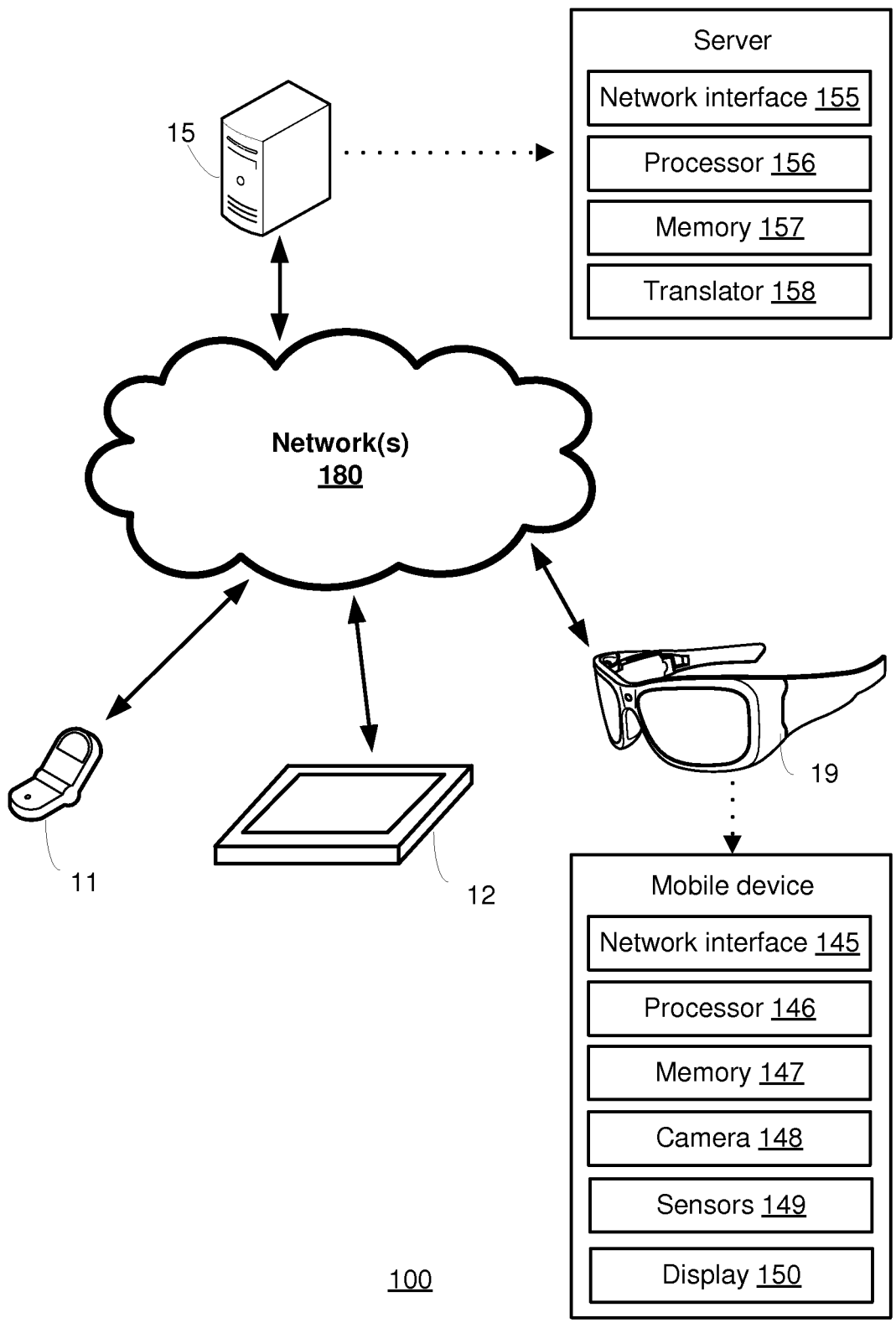
FIG. 1 is a block diagram of one embodiment of a networked computing environment in which the disclosed technology may be practiced.

Technology is described for generating and displaying holographic visual aids associated with a story while the story is being read. The holographic visual aids may be displayed to an end user of a head-mounted display device (HMD) while the HMD detects the end user reading a story (e.g., via eye tracking and gaze detection techniques) or detects the end user listening to the story being read aloud (e.g., via audio and voice recognition techniques). The story may be embodied within a reading object (e.g., a real or virtual book) in which words of the story may be displayed to the end user. The holographic visual aids may include a predefined character animation that is synchronized to a portion of the story corresponding with the character being animated. A reading pace of a portion of the story may be used to control the playback speed of the predefined character animation in real-time such that the character is perceived to be lip-syncing the story being read aloud (i.e., the character will make virtual movements including mouth shape movements at a speed determined by the reading pace set by the end user or another person reading the story aloud). In some cases, an existing book without predetermined augmented reality tags may be augmented with holographic visual aids.

One issue regarding the education of children and youth involves facilitating and encouraging the reading of stories, as well as improving reading comprehension. Moreover, complex stories including multiple characters and subplots (e.g., a Shakespeare play) may be confusing to inexperienced readers or otherwise difficult to follow thereby preventing the readers from fully enjoying the reading experience. Thus, there is a need for an augmented reality system capable of generating and displaying holographic visual aids related to a story in order to enhance the reading experience of the story and to reward the reading of the story.

With the advent and proliferation of continuously-enabled and network-connected mobile computing devices, such as head-mounted display devices (HMDs), the amount of information available to an end user of such computing devices at any given time is immense. In some cases, an augmented reality environment may be perceived by an end user of a mobile computing device. In one example, the augmented reality environment may comprise a personalized augmented reality environment wherein one or more virtual objects are generated and displayed to an end user based on an identification of the end user (e.g., is the end user a child or parent), user preferences associated with the end user, the physical location of the end user (e.g., is the end user in a bedroom or on a train), and/or physical interactions with objects within an environment (e.g., is the end user holding onto a particular reading object). In one embodiment, the one or more virtual objects may correspond with a predefined character animation (e.g., a virtual ogre mouthing "fee-fi-fo-fum") that may be displayed upon the detection of a particular triggering event (e.g., an end user opening a "Jack and the Beanstalk" book to a particular page). The predefined character animation may be synchronized to a portion of a story corresponding with the character being animated (e.g., played upon the detection of the end user speaking particular words from the story) and/or animated at a rate determined by a reading pace set by the end user or another person reading the story aloud (i.e., the reader's voice is capable of being heard or otherwise detected).

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file is a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. Sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment for an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing the HMD, the end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment is performed by server 15 (i.e., on the server side) while camera localization is performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may be used to provide an augmented reality environment in which a virtual character's actions (including speaking performance) are synchronized to words spoken by a particular person. In some cases, utterances made by the particular person may be analyzed using voice recognition and/or speech recognition techniques. An utterance may include a complete unit of speech associated with a particular person, and may generally but not always be bounded by silence lasting a predetermined duration. For example, an utterance may comprise a spoken phrase in which one second of silence exists before and after the spoken phrase. The particular person's utterances may be used to synchronize and control the playback or display of predetermined animated sequences corresponding with portions of a story being read by the particular person.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data necessary to provide an augmented reality environment on mobile device 19.

Figure 2B:
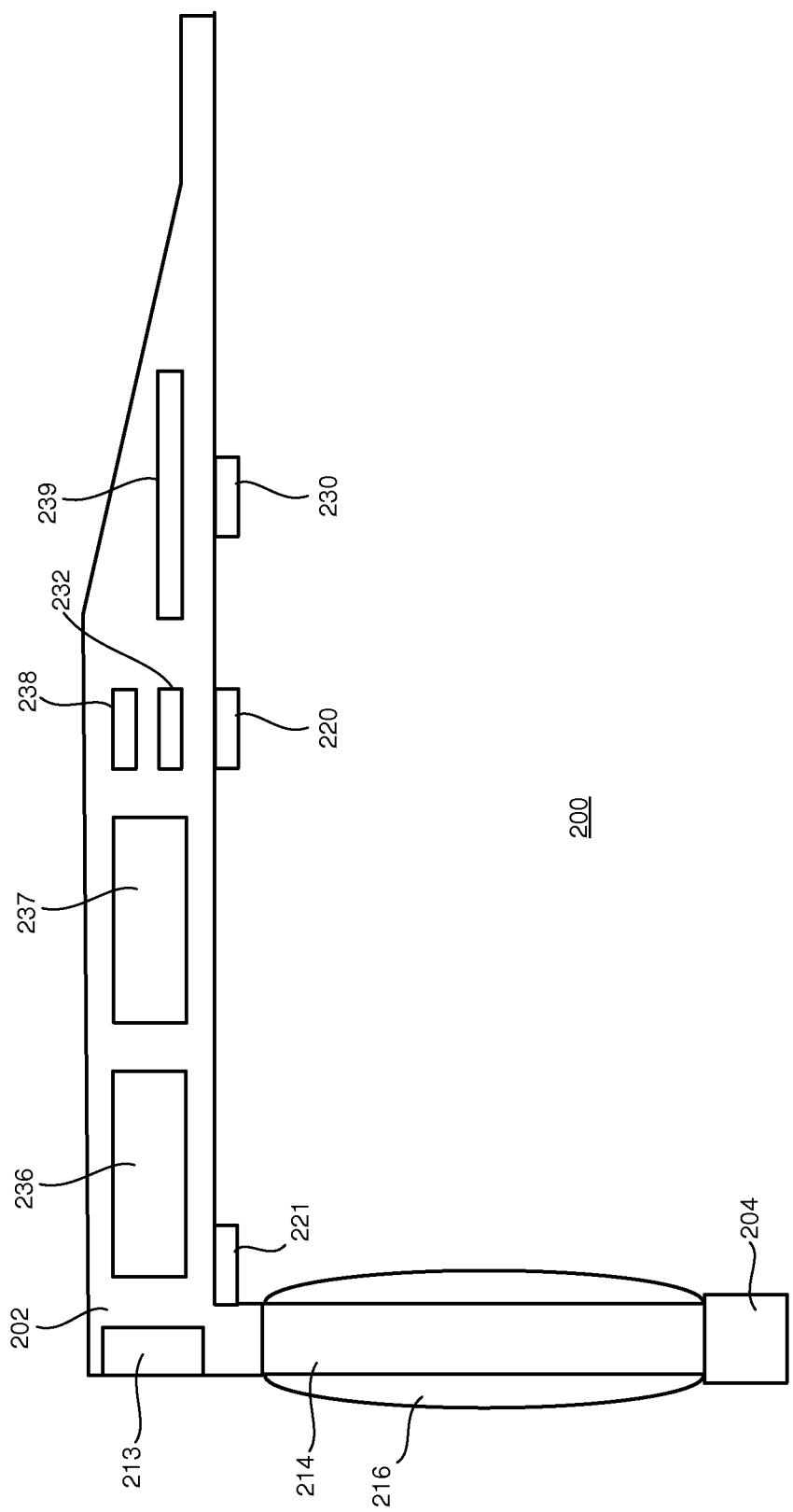
FIG. 2B depicts one embodiment of a portion of an HMD.

FIG. 2B depicts one embodiment of a portion of an HMD, such as mobile device 19 in FIG. 1. Only the right side of a head-mounted display device (HMD) 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
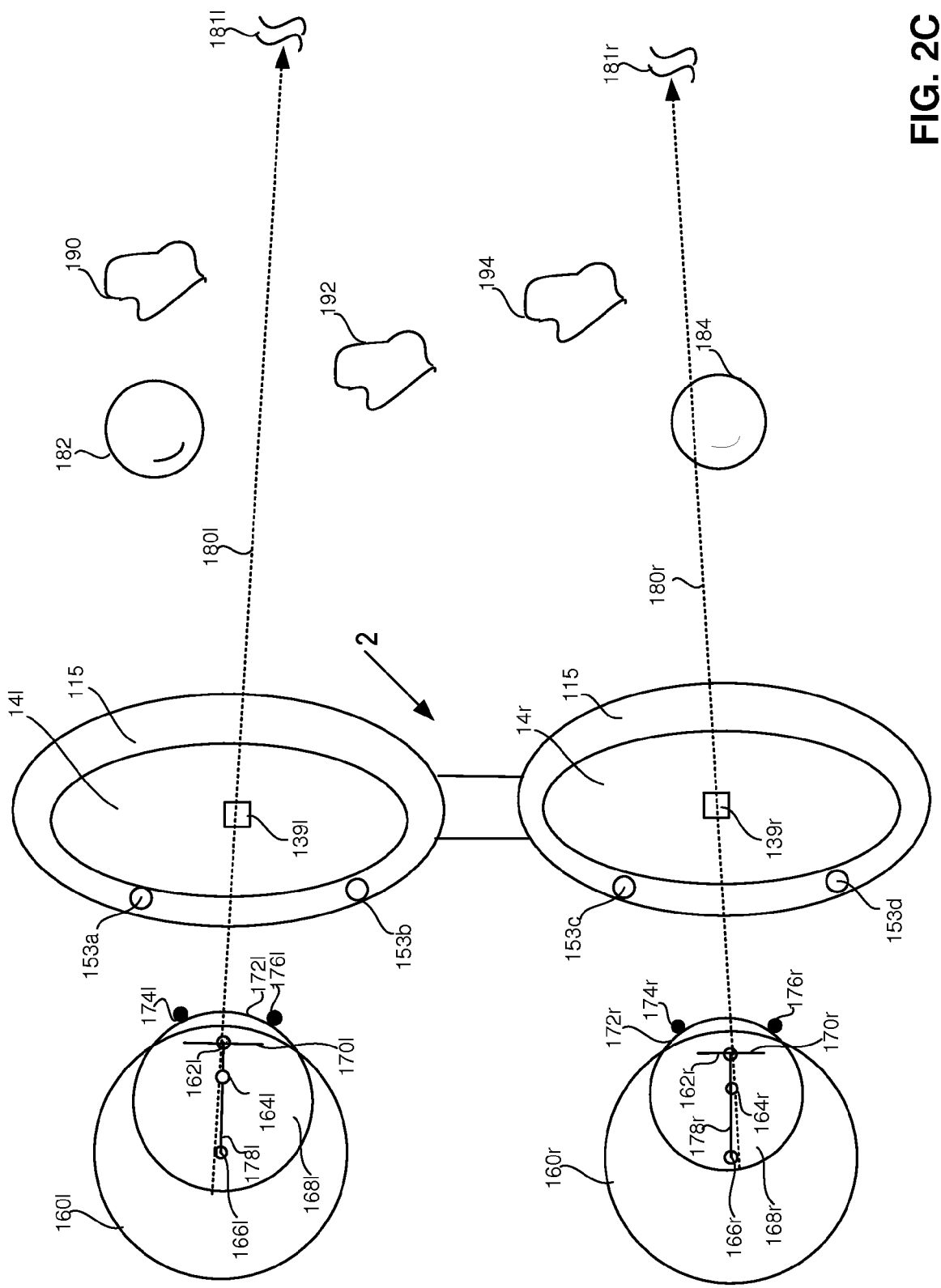
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
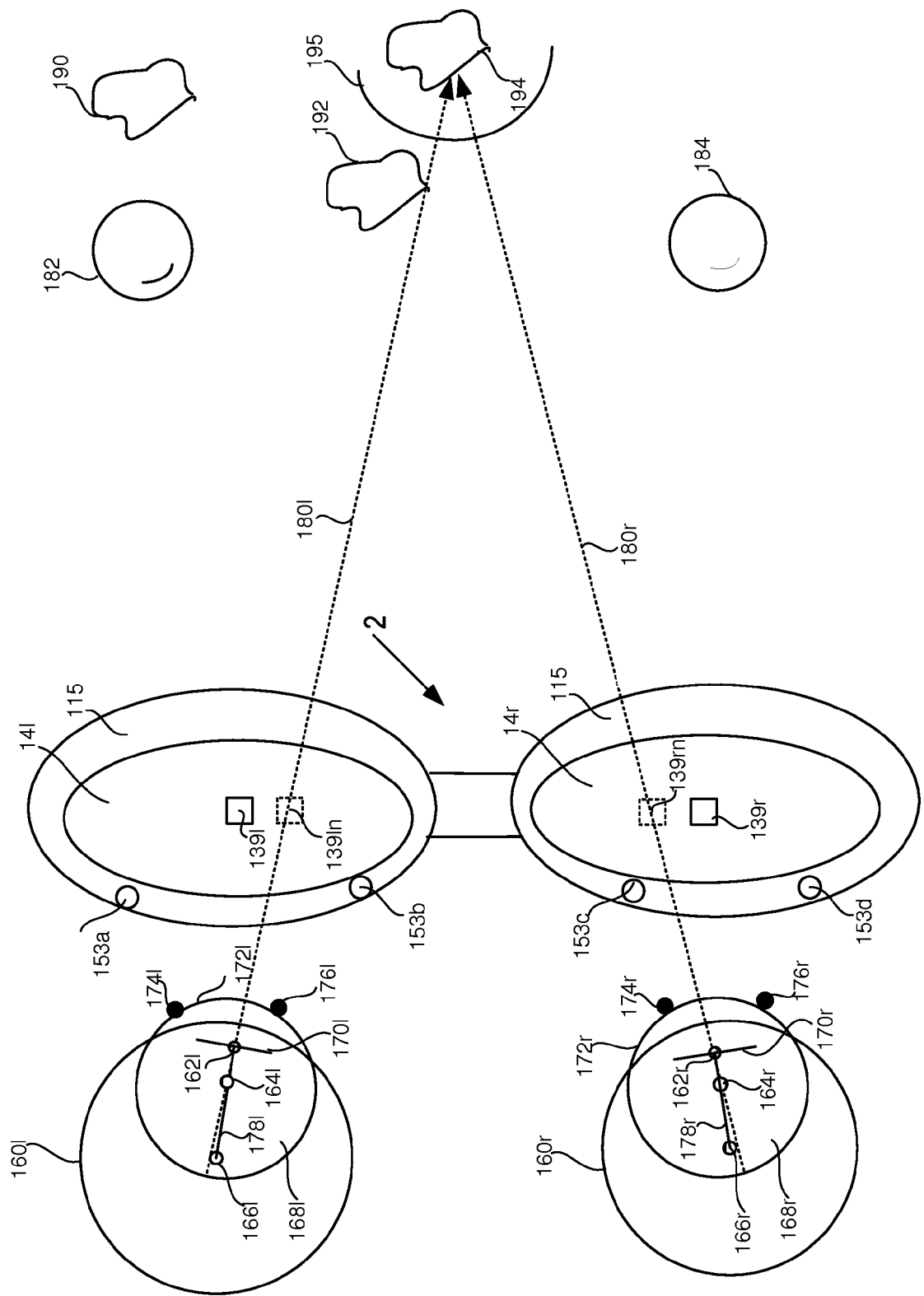
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. patent application Ser. No.

13/250,878, entitled "Personal Audio/Visual System," filed Sep. 30, 2011, which is herein incorporated by reference in its entirety.

Figure 2E:
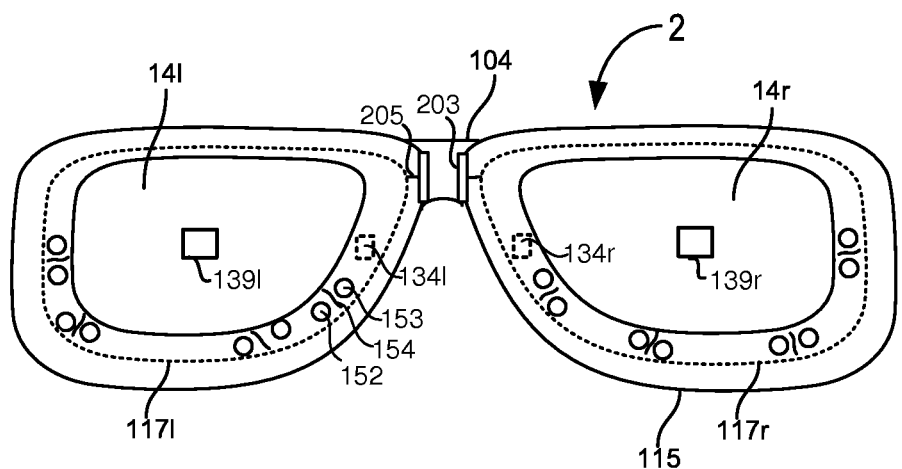
FIG. 2E depicts one embodiment of a portion of an HMD with movable display optical systems including gaze detection elements.

FIG. 2E depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 2E, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115.

In one embodiment, the at least one sensor 134 may be a visible light camera (e.g., an RGB camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 2E, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 2E, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 2F:
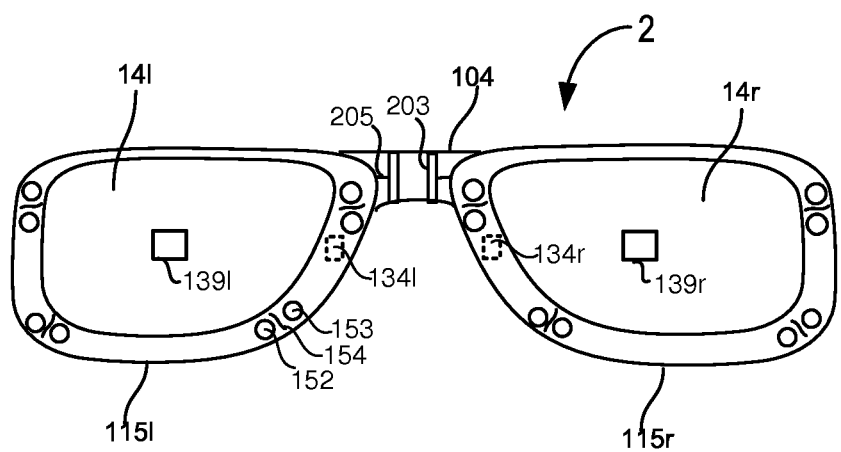
FIG. 2F depicts an alternative embodiment of a portion of an HMD with movable display optical systems including gaze detection elements.

FIG. 2F depicts an alternative embodiment of a portion of an HMD 2 with movable display optical systems including gaze detection elements. As depicted, each display optical system 14 is enclosed in a separate frame portion 115*l*, 115*r*. Each of the frame portions may be moved separately by the motors 203. More information about HMDs with movable display optical systems can be found in U.S. patent application Ser. No. 13/250,878, entitled "Personal Audio/Visual System," filed Sep. 30, 2011, which is herein incorporated by reference in its entirety.

FIG. 2G depicts one embodiment of a side view of a portion of an HMD 2 including an eyeglass temple 102 of the frame 115. At the front of frame 115 is a front facing video camera 113 that can capture video and still images. In some embodiments, front facing camera 113 may include a depth camera as well as a visible light or RGB camera. In one example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light cameras (e.g., an RGB camera or image sensor) and depth cameras can be used. More information about depth cameras can be found in U.S. patent application Ser. No. 12/813,675, filed on Jun. 11, 2010, incorporated herein by reference in its entirety. The data from the cameras may be sent to control circuitry 136 for processing in order to identify objects through image segmentation and/or edge detection techniques.

Inside temple 102, or mounted to temple 102, are ear phones 130, inertial sensors 132, GPS transceiver 144, and temperature sensor 138. In one embodiment, inertial sensors 132 include a three axis magnetometer, three axis gyro, and three axis accelerometer. The inertial sensors are for sensing position, orientation, and sudden accelerations of HMD 2. From these movements, head position may also be determined.

In some cases, HMD 2 may include an image generation unit which can create one or more images including one or more virtual objects. In some embodiments, a microdisplay may be used as the image generation unit. As depicted, microdisplay assembly 173 comprises light processing elements and a variable focus adjuster 135. An example of a light processing element is a microdisplay unit 120. Other examples include one or more optical elements such as one or more lenses of a lens system 122 and one or more reflecting elements such as surfaces 124. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124. The optical alignment may be along an optical axis 133 or an optical path 133 including one or more optical axes. The microdisplay unit 120 projects the image of the virtual object through lens system 122, which may direct the image light onto reflecting element 124. The variable focus adjuster 135 changes the displacement between one or more light processing elements in the optical path of the microdisplay assembly or an optical power of an element in the microdisplay assembly. The optical power of a lens is defined as the reciprocal of its focal length (i.e., 1/focal length) so a change in one effects the other. The change in focal length results in a change in the region of the field of view which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

More information about adjusting a focal distance of a microdisplay assembly can be found in U.S. patent Ser. No. 12/941,825 entitled "Automatic Variable Virtual Focus for Augmented Reality Displays," filed Nov. 8, 2010, which is herein incorporated by reference in its entirety.

In one embodiment, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

Several different image generation technologies may be used to implement microdisplay 120. In one example, microdisplay 120 can be implemented using a transmissive projection technology where the light source is modulated by optically active material and backlit with white light. These technologies are usually implemented using LCD type displays with powerful backlights and high optical energy densities. Microdisplay 120 can also be implemented using a reflective technology for which external light is reflected and modulated by an optically active material. The illumination may be forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

FIG. 2H depicts one embodiment of a side view of a portion of an HMD 2 which provides support for a three dimensional adjustment of a microdisplay assembly. Some of the numerals illustrated in the FIG. 2G above have been removed to avoid clutter in the drawing. In some embodiments where the display optical system 14 is moved in any of three dimensions, the optical elements represented by reflecting surface 124 and the other elements of the microdisplay assembly 173 may also be moved for maintaining the optical path 133 of the light of a virtual image to the display optical system. An XYZ transport mechanism in this example made up of one or more motors represented by motor block 203 and shafts 205 under control of control circuitry 136 control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

Figure 3:
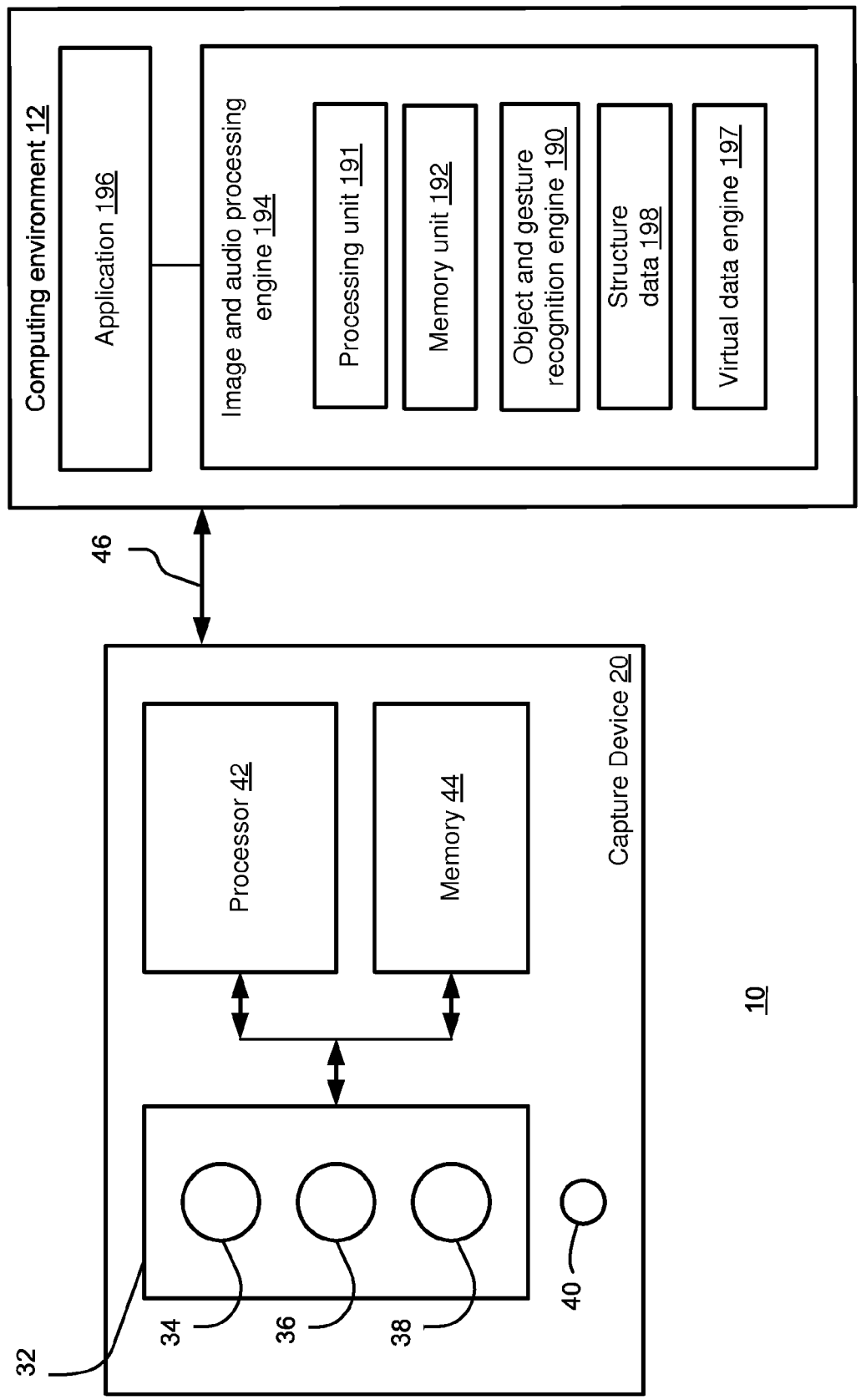
FIG. 3 illustrates one embodiment of a computing system including a capture device and computing environment.

FIG. 3 illustrates one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the image camera component 32.

The image camera component 32 may include an IR light component 34, a three-dimensional (3D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a gaming application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, people, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting and tracking objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

FIGS. 4A-4D provide examples of various environments in which one or more virtual objects associated with a story (e.g., a holographic visual aid for the story) may be generated and/or displayed to an end user of a head-mounted display device while the end user is reading the story or perceiving the story being read aloud. In some cases, the story may be embodied within a reading object (e.g., a real or virtual book) in which words of the story may be displayed to the end user or another person reading the story. The one or more virtual objects may include a predefined character animation corresponding with a character from the story or a predefined animated scene corresponding with a portion of the story.

Figure 4A:
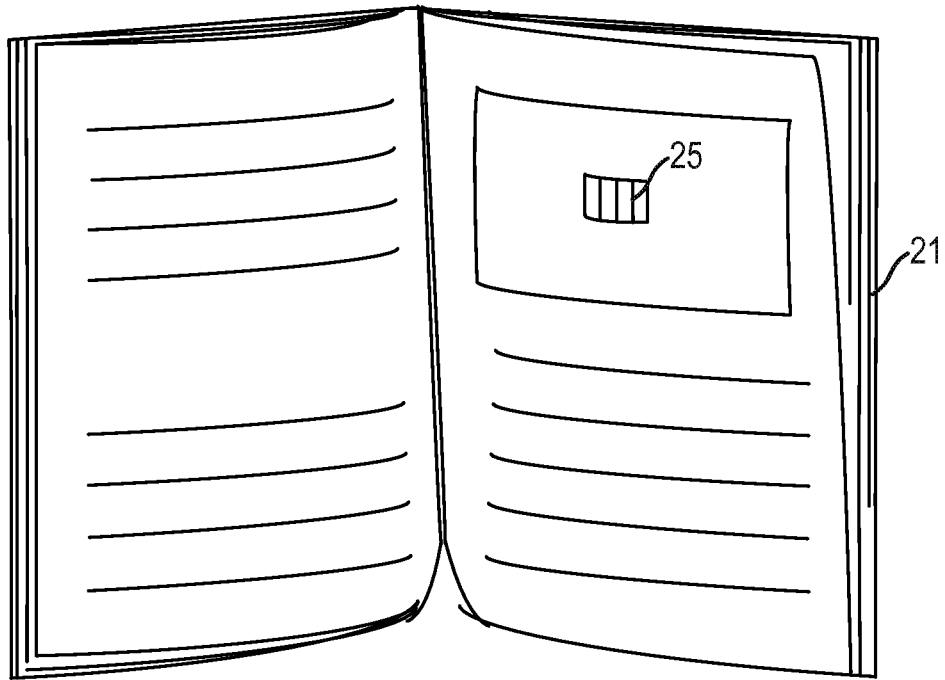
FIG. 4A depicts one embodiment of a reading object as seen by an end user wearing an HMD.

FIG. 4A depicts one embodiment of a reading object 21 as seen by an end user wearing an HMD, such as mobile device 19 in FIG. 1. The reading object may comprise a book, magazine, or piece of literature. Reading object 21 includes an augmented reality (AR) tag 25. The AR tag 25 may comprise a unique image or graphic that may be used to determine one or more virtual objects to display associated with the AR tag 25 such as a holographic visual aid. The AR tag 25 may also be used to determine a location on the reading object 21 in which to place the one or more virtual objects. In some embodiments, a reading object may comprise an existing book without any predetermined AR tags (e.g., a book published in 1969). In this case, the existing book may be retrofitted with an AR tag by identifying unique words or pictures associated with a particular page of the existing book without any predetermined AR tags.

Figure 4B:
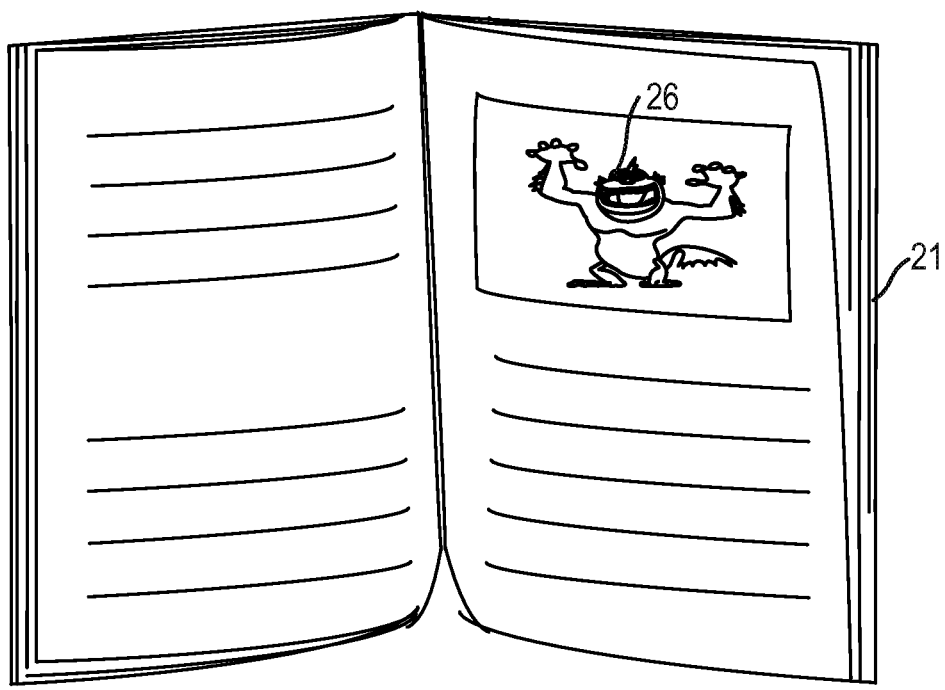
FIG. 4B depicts one embodiment of an augmented reality environment as seen by an end user wearing an HMD.

FIG. 4B depicts one embodiment of an augmented reality environment as seen by an end user wearing an HMD, such as mobile device 19 in FIG. 1. As depicted, the reading object 21 of FIG. 4A has been augmented with a virtual object 26 in a location determined by the AR tag 25 of FIG. 4A. The virtual object 26 may comprise a static image or a dynamic holographic animation comprising a sequence of images. As the virtual object 26 is displayed or overlaid over the reading object 21 as perceived through the see-through lenses of the HMD, the end user of the HMD may perceive that the virtual object 26 is part of (or attached to) the reading object 21. In some cases, the virtual object 26 may be visually attached to the reading object 21 (e.g., the reference coordinates for virtual object 26 may be relative to a coordinate space associated with the reading object 26). In this case, as the reading object 21 is moved within a field of view of an HMD, the virtual object 26 will appear fixed to the reading object.

Figure 4C:
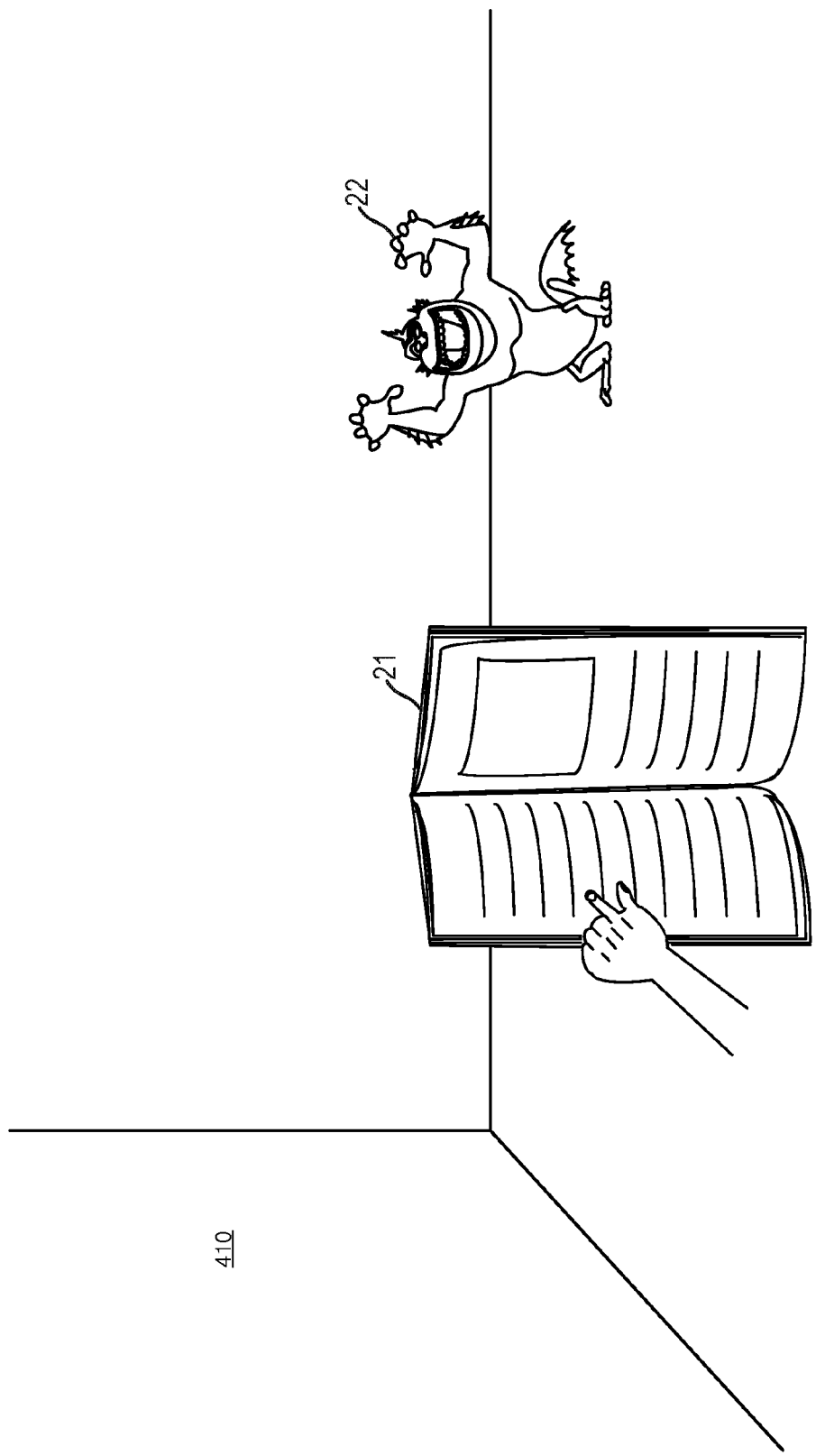
FIG. 4C depicts one embodiment of an augmented reality environment as seen by an end user wearing an HMD.

FIG. 4C depicts one embodiment of an augmented reality environment 410 as seen by an end user wearing an HMD, such as mobile device 19 in FIG. 1. As depicted, the augmented reality environment 410 has been augmented with a virtual object 22. In some cases, the virtual object 22 may be generated based on the existence of an AR tag (e.g., AR tag 25 of FIG. 4A) associated with reading object 21. The location of the virtual object 22 may be determined based on a predetermined space (e.g., on top of a bed or table) within the real-world environment associated with the augmented reality environment 410. The virtual object 22 may comprise a static image or a holographic animation comprising a sequence of images. As the virtual object 22 is displayed or overlaid over the real-world environment as perceived through the see-through lenses of the HMD, the end user of the HMD may perceive that the virtual object 22 exists within the real-world environment associated with augmented reality environment 410.

Figure 4D:
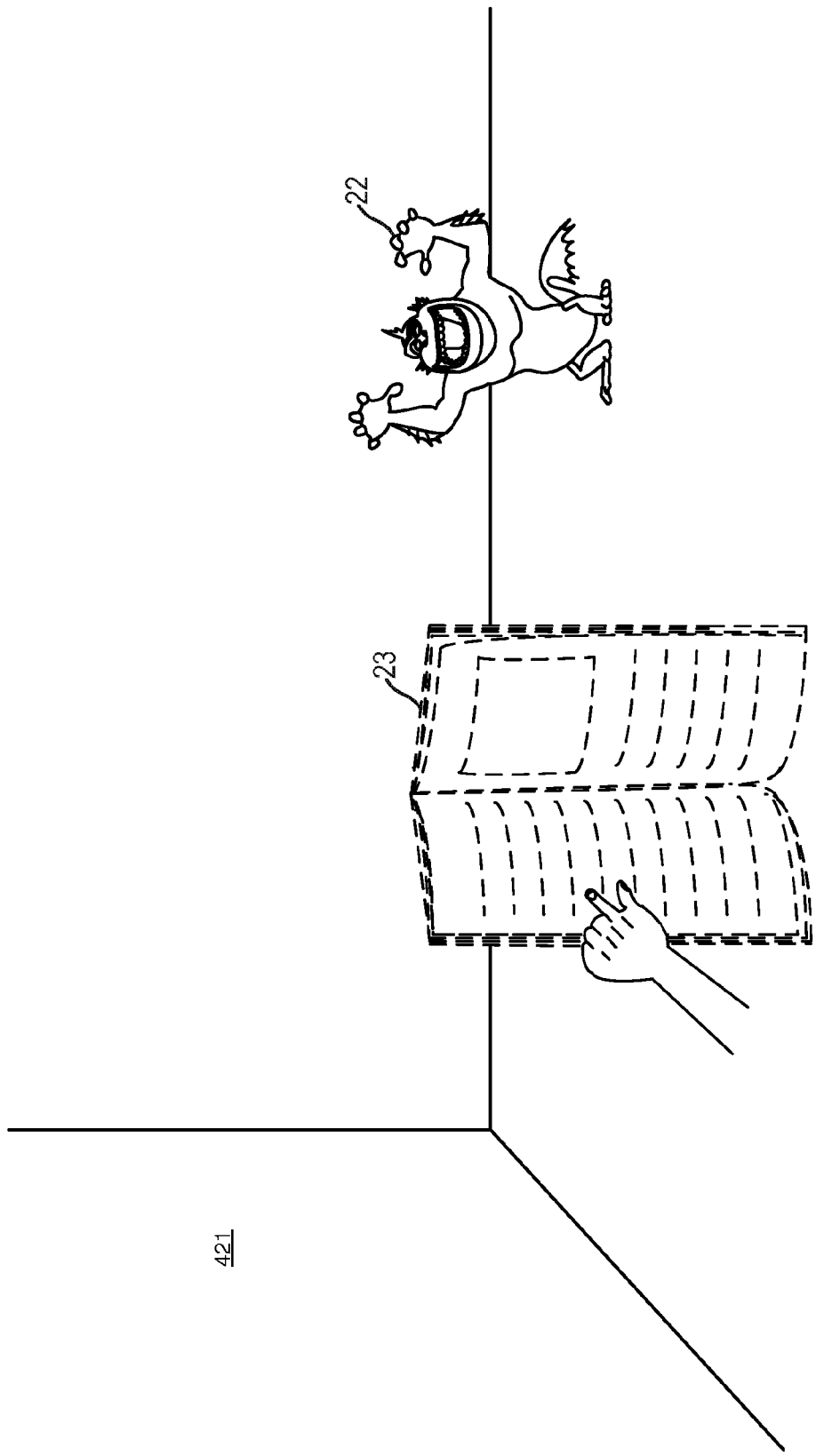
FIG. 4D depicts one embodiment of an augmented reality environment as seen by an end user wearing an HMD.

FIG. 4D depicts one embodiment of an augmented reality environment 421 as seen by an end user wearing an HMD, such as mobile device 19 in FIG. 1. As depicted, the augmented reality environment 421 has been augmented with a virtual object 22. In some cases, the virtual object 22 may be generated based on the existence of a virtual AR tag associated with virtual reading object 23. The virtual reading object 23 may comprise a virtual book or magazine. The virtual reading object 23 allows the end user of the HMD to read words and text associated with the virtual reading object 23. The location of the virtual object 22 may be determined based on a predetermined space (e.g., on top of a bed or table) within the real-world environment associated with the augmented reality environment 421. The virtual object 22 may comprise a static image or a holographic animation comprising a sequence of images. As the virtual object 22 is displayed or overlaid over the real-world environment as perceived through the see-through lenses of the HMD, the end user of the HMD may perceive that the virtual object 22 exists within the real-world environment associated with augmented reality environment 421.

Figure 5A:
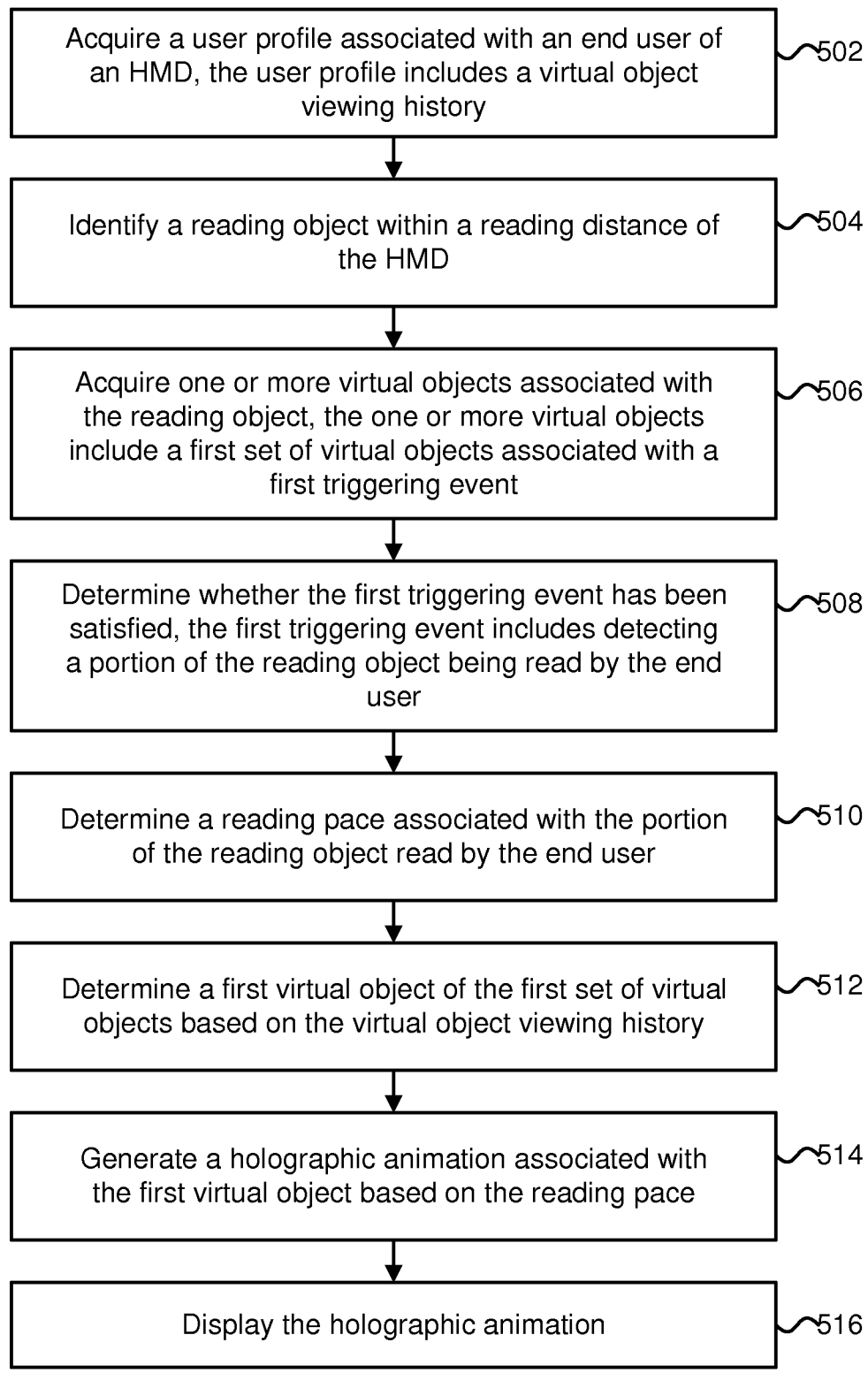
FIG. 5A is a flowchart describing one embodiment of a method for generating and displaying holographic visual aids associated with a story to an end user of a head-mounted display device while the end user is reading the story.

FIG. 5A is a flowchart describing one embodiment of a method for generating and displaying holographic visual aids associated with a story to an end user of a head-mounted display device while the end user is reading the story. In one embodiment, the process of FIG. 5A is performed by a mobile device, such as mobile device 19 in FIG. 1.

In step 502, a user profile associated with an end user of an HMD is acquired. The user profile may include a virtual object viewing history. The virtual object viewing history may comprise a history of virtual objects viewed by the end user including time and date information for each viewing and corresponding triggering events for each of the virtual objects recorded within the virtual object viewing history. In one embodiment, the end user associated with the user profile may be identified via voice recognition (e.g., comparing the end user's voice using a voice model corresponding with the end user) and/or image recognition (e.g., identifying eye characteristics such as iris or retina patterns corresponding with the end user).

In step 504, a reading object is identified within a reading distance of the HMD. A reading distance may be determined as a maximum distance within which a reading object may be read by an end user of an HMD. In one example, a reading distance may comprise 1.5 meters. The reading distance may be used to create a reading hemisphere (i.e., a 3D space in which reading objects may be read and augmented) relative to a coordinate space associated with an HMD with a radius equal to the reading distance. A reading object may include a book, magazine, journal, newspaper, or work of literature fixed in a tangible medium of expression.

In one embodiment, the reading object may be identified as an object being touched by the end user within the reading distance which includes words or pictures. In some embodiments, a title, author, illustration, or ISBN number associated with the reading object may be identified via image recognition techniques. The shape of the reading object may also be used to identify the reading object as a book or magazine and to orient and direct image processing techniques to particular portions of the reading object (e.g., to analyze the cover of the reading object). In some cases, once the reading object has been identified, it may be highlighted or illuminated to notify the end user of the HMD that it is an augmentable reading object.

In step 506, one or more virtual objects associated with the reading object are acquired. The one or more virtual objects may include a first set of virtual objects associated with a first triggering event. A triggering event may determine when one of the first set of virtual objects is generated and displayed to an end user of an HMD. The first set of virtual objects may correspond with a particular page of the reading object or a particular AR tag on a particular page of the reading object. In some cases, the first set of virtual objects may correspond with a particular sequence of words located within the reading object. The first set of virtual objects may be used to augment the reading object with images and/or sounds. In one embodiment, the first set of virtual objects may be used to update or modify words and/or images on a page of the reading object. The first triggering event may include the detection of a particular utterance, keyword, or phrase uttered by the end user of the HMD. The first triggering event may also include the detection of the end user of the HMD gazing at or focusing on a particular portion of the reading object.

In step 508, it is determined whether the first triggering event has been satisfied. The first triggering event may include detecting that a portion of the reading object is being read by the end user. In one embodiment, gaze detection techniques may be used to determine a portion of the reading object being focused on and/or read by the end user. In some cases, the first triggering event may include detecting the end user looking at an AR tag on a particular page of the reading object. In another embodiment, audio and/or voice recognition techniques may be used to determine whether the end user (or another person within speaking distance of the end user) has spoken a particular word or phrase found within the reading object. One embodiment of a process for determining whether a triggering event has been satisfied is described later in reference to FIG. 6A.

In step 510, a reading pace associated with the portion of the reading object read by the end user is determined. In one embodiment, the reading pace may comprise a speed at which the end user has spoken or looked at words corresponding with the portion of the reading object. For example, if a particular phrase comprising the portion of the reading object includes a particular number of words, then the reading pace may comprise the particular number of words divided by the time that it took the end user to speak the particular number of words (e.g., in words per minute). In some embodiments, the reading pace may comprise an average number of words per minute associated with previously read phrases in which the speaker was not interrupted. For example, if a parent reads a story including ten sentences and a child interrupts the parents while the parent is reading three of the ten sentences, then only the seven sentences that were not interrupted may be used in the determination of the reading pace. In some cases, only the last three phrases or sentences spoken by the parent (i.e., the three most recently spoken phrases) may be used in the determination of the reading pace.

In step 512, a first virtual object of the first set of virtual objects is determined based on the virtual object viewing history. In one embodiment, the first virtual object may comprise a virtual object that has not been previously viewed by the end user of the HMD. The first virtual object may comprise the virtual object of the first set of virtual objects that has been viewed the fewest number of times. In other embodiments, the first virtual object may comprise a virtual object chosen randomly from the first set of virtual objects. In the case that the first set of virtual objects comprises virtual objects of varying degrees of detail or content, characteristics of the end user (e.g., their age and/or experience with the reading object) may be used to determine the first virtual object as the virtual object most appropriate for the end user. In one embodiment, the first virtual object may be determined based on end user feedback associated with a challenge (e.g., user feedback regarding a choose your own adventure question provided to the end user, or regarding which string of a virtual piñata to pull).

In step 514, a holographic animation associated with the first virtual object is generated based on the reading pace. In one embodiment, a predetermined holographic animation (e.g., an animated scene) associated with the first virtual object may be generated at a playback speed corresponding with the reading pace. The holographic animation may overlay or write-over portions of text and/or images on the reading object. The holographic animation may be sized or scaled based on a size of the reading object (e.g., the size of a book may determine the size of the holographic animation displayed to an end user). In some cases, the holographic animation may include mouth shape adjustments that are perceived to occur at the reading pace. Embodiments of various processes for generating holographic animations are described later in reference to FIGS. 6C and 6D. In step 516, the holographic animation is displayed. The holographic animation may be displayed to the end user using a see-through display of the HMD.

In some embodiments, the holographic animation may appear to an end user of an HMD as being attached to the reading object such that the holographic animation will change orientation corresponding with end user changes to the orientation of the reading object. In other embodiments, the holographic animation may appear in a portion of the environment associated with the HMD (e.g., on a rug in a living room or on a bed in a bedroom). The portion of the environment in which the holographic animation appears may be preselected or predetermined by the end user prior to generation of the holographic animation. In one embodiment, a location corresponding with a virtual playhouse may be determined using coordinates specified in the user profile associated with an end user of an HMD.

Figure 5B:
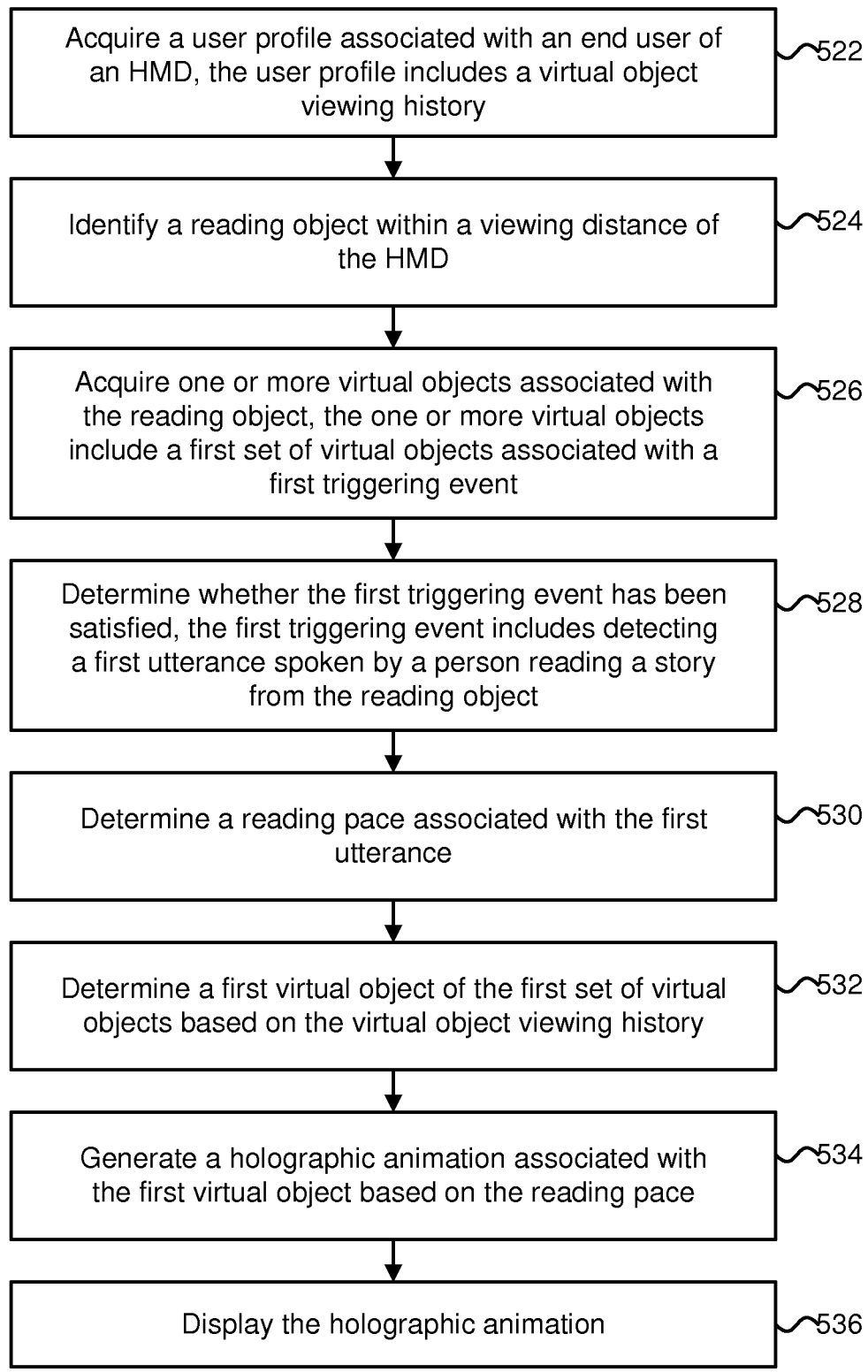
FIG. 5B is a flowchart describing one embodiment of a method for generating and displaying holographic visual aids associated with a story to an end user of a head-mounted display device while the end user is perceiving or listening to the story being read aloud.

FIG. 5B is a flowchart describing one embodiment of a method for generating and displaying holographic visual aids associated with a story to an end user of a head-mounted display device while the end user is perceiving or listening to the story being read aloud. In one embodiment, the process of FIG. 5A is performed by a mobile device, such as mobile device 19 in FIG. 1.

In step 522, a user profile associated with an end user of an HMD is acquired. The user profile may include a virtual object viewing history. The virtual object viewing history may comprise a history of virtual objects viewed by the end user including time and date information for each viewing and corresponding triggering events for each of the virtual objects recorded within the virtual object viewing history. In one embodiment, the end user associated with the user profile may be identified via voice recognition (e.g., comparing the end user's voice using a voice model corresponding with the end user) and/or image recognition (e.g., identifying eye characteristics such as iris or retina patterns corresponding with the end user).

In step 524, a reading object is identified within a viewing distance of the HMD. A viewing distance may be determined as a maximum distance within which a reading object may be viewed by an end user of an HMD. In one example, a viewing distance may comprise 5.0 meters. The viewing distance may be used to create a viewing hemisphere (i.e., a 3D space in which augmented reading objects may be viewed) relative to a coordinate space associated with an HMD with a radius equal to the viewing distance. A reading object may include a book, magazine, journal, newspaper, or work of literature fixed in a tangible medium of expression.

In step 526, one or more virtual objects associated with the reading object are acquired. The one or more virtual objects may include a first set of virtual objects associated with a first triggering event. A triggering event may determine when one of the first set of virtual objects is generated and displayed to an end user of an HMD. The first set of virtual objects may correspond with a particular page of the reading object or a particular AR tag on a particular page of the reading object. In some cases, the first set of virtual objects may correspond with a particular sequence of words located within the reading object. The first set of virtual objects may be used to augment the reading object with images and/or sounds. In one embodiment, the first set of virtual objects may be used to update or modify words and/or images on a page of the reading object. The first triggering event may include the detection of a particular utterance, keyword, or phrase uttered by the end user of the HMD. The first triggering event may also include the detection of the end user of the HMD gazing at or focusing on a particular portion of the reading object.

In step 528, it is determined whether the first triggering event has been satisfied. The first triggering event may include detecting a first utterance spoken by a person reading a story from the reading object. In one embodiment, the person reading the story may comprise the end user of the HMD. In another embodiment, the person reading the story may comprise a different person than the end user of the HMD. The different person may or may not be wearing another HMD. In one example, the different person comprises a parent reading a book to the end user comprising a child wearing an HMD. The first utterance spoken by the person may be detected via the application of voice recognition and/or speech recognition techniques to an audio signal received at the HMD corresponding with the first utterance. Identification of a particular person's voice may be performed based on a voice model included within a user profile associated with the end user. In another embodiment, audio and/or voice recognition techniques may be used to determine whether the end user (or another person within speaking distance of the end user) has spoken the first utterance. One embodiment of a process for determining whether a triggering event has been satisfied is described later in reference to FIG. 6B.

In step 530, a reading pace associated with the first utterance is determined. In one embodiment, the reading pace may comprise a speed at which the person has spoken the first utterance. In one example, the first utterance may include a particular number of words and the reading pace may comprise the particular number of words divided by the time that it took the person to speak the particular number of words (e.g., in words per minute). In some embodiments, the reading pace may comprise an average number of words per minute associated with previously read phrases in which the speaker was not interrupted. For example, if a parent reads a story including ten sentences and a child interrupts the parents while the parent is reading three of the ten sentences, then only the seven sentences that were not interrupted may be used in the determination of the reading pace. In some cases, only the last three phrases or sentences spoken by the parent (i.e., the three most recently spoken phrases) may be used in the determination of the reading pace.

In step 532, a first virtual object of the first set of virtual objects is determined based on the virtual object viewing history. In one embodiment, the first virtual object may comprise a virtual object that has not been previously viewed by the end user of the HMD. The first virtual object may comprise the virtual object of the first set of virtual objects that has been viewed the fewest number of times. In other embodiments, the first virtual object may comprise a virtual object chosen randomly from the first set of virtual objects. In the case that the first set of virtual objects comprises virtual objects of varying degrees of detail or content, characteristics of the end user (e.g., their age and/or experience with the reading object) may be used to determine the first virtual object as the virtual object most appropriate for the end user. In one embodiment, the first virtual object may be determined based on end user feedback associated with a virtual challenge.

In step 534, a holographic animation associated with the first virtual object is generated based on the reading pace. In one embodiment, a predetermined holographic animation (e.g., an animated scene) associated with the first virtual object may be generated at a playback speed corresponding with the reading pace. The holographic animation may overlay or write-over portions of text and/or images on the reading object. The holographic animation may be sized or scaled based on a size of the reading object (e.g., the size of a book may determine the size of the holographic animation displayed to an end user). In some cases, the holographic animation may include mouth shape adjustments that are perceived to occur at the reading pace. Embodiments of various processes for generating holographic animations are described later in reference to FIGS. 6C and 6D. In step 536, the holographic animation is displayed. The holographic animation may be displayed to the end user using a see-through display of the HMD.

Figure 6A:
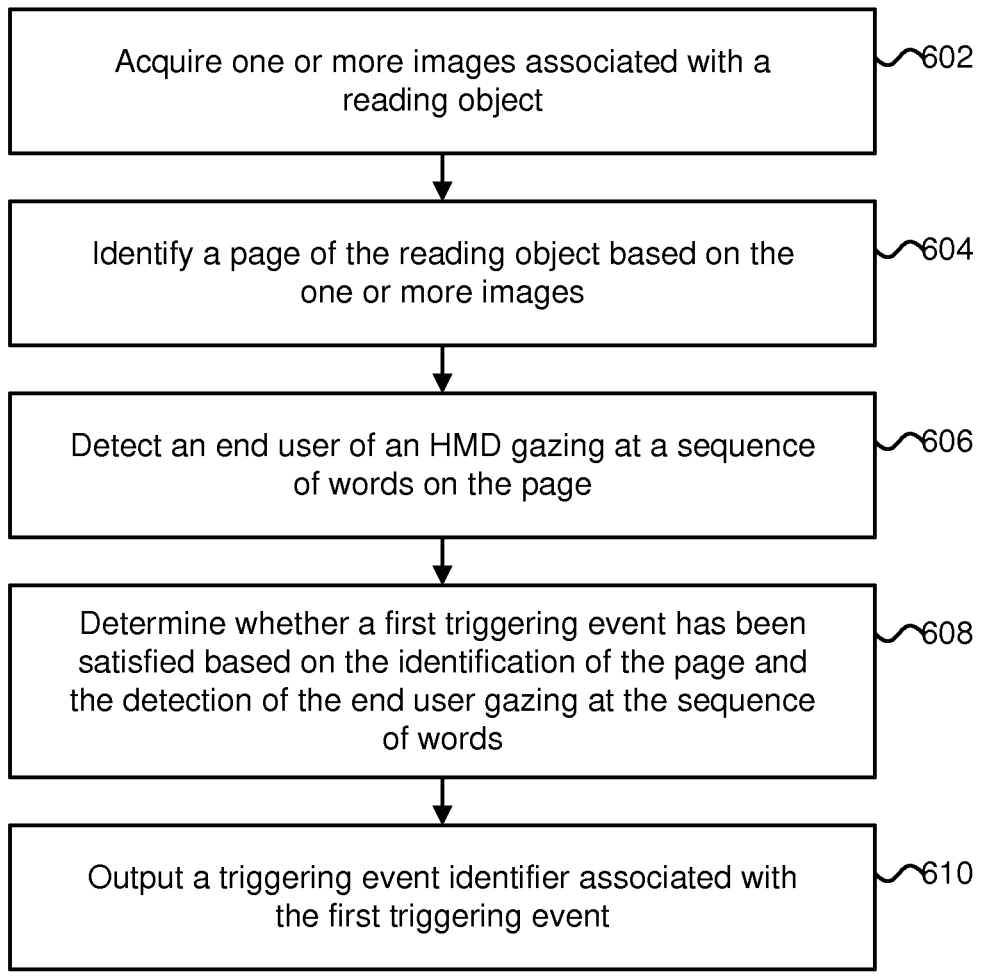
FIG. 6A is a flowchart describing one embodiment of a process for determining whether a triggering event has been satisfied.

FIG. 6A is a flowchart describing one embodiment of a process for determining whether a triggering event has been satisfied. The process described in FIG. 6A is one example of a process for implementing step 508 in FIG. 5A. In one embodiment, the process of FIG. 6A is performed by a mobile device, such as mobile device 19 in FIG. 1.

In step 602, one or more images associated with a reading object are acquired. In one embodiment, an image capture device of an HMD may be used to acquire one or more images of an environment in which the reading object exists. The one or more images may comprise color and/or depth images. In step 604, a page of the reading object is identified based on the one or more images. In the case that the reading object comprises a book, the page of the reading object may be identified by identifying that the book is open to a particular page with a corresponding marking (e.g., an identifiable page number) or AR tag. In some embodiments, one or more words on the page of the reading object may be captured and compared with predetermined word patterns associated with the reading object. In one example, predetermined word patterns corresponding with various pages of a particular book may be acquired and stored on the HMD upon recognition of the reading object as the particular book.

In step 606, it is detected that an end user of an HMD is gazing at a sequence of words on the page. The sequence of words may comprise a sentence or a portion of a sentence. In step 608, it is determined whether a first triggering event has been satisfied based on the identification of the page and the detection of the end user gazing at the sequence of words. In step 610, a triggering event identifier associated with the first triggering event is outputted. The triggering event identifier (e.g., a unique numerical identifier) may be used to identify that a particular triggering event has been satisfied.

Figure 6B:
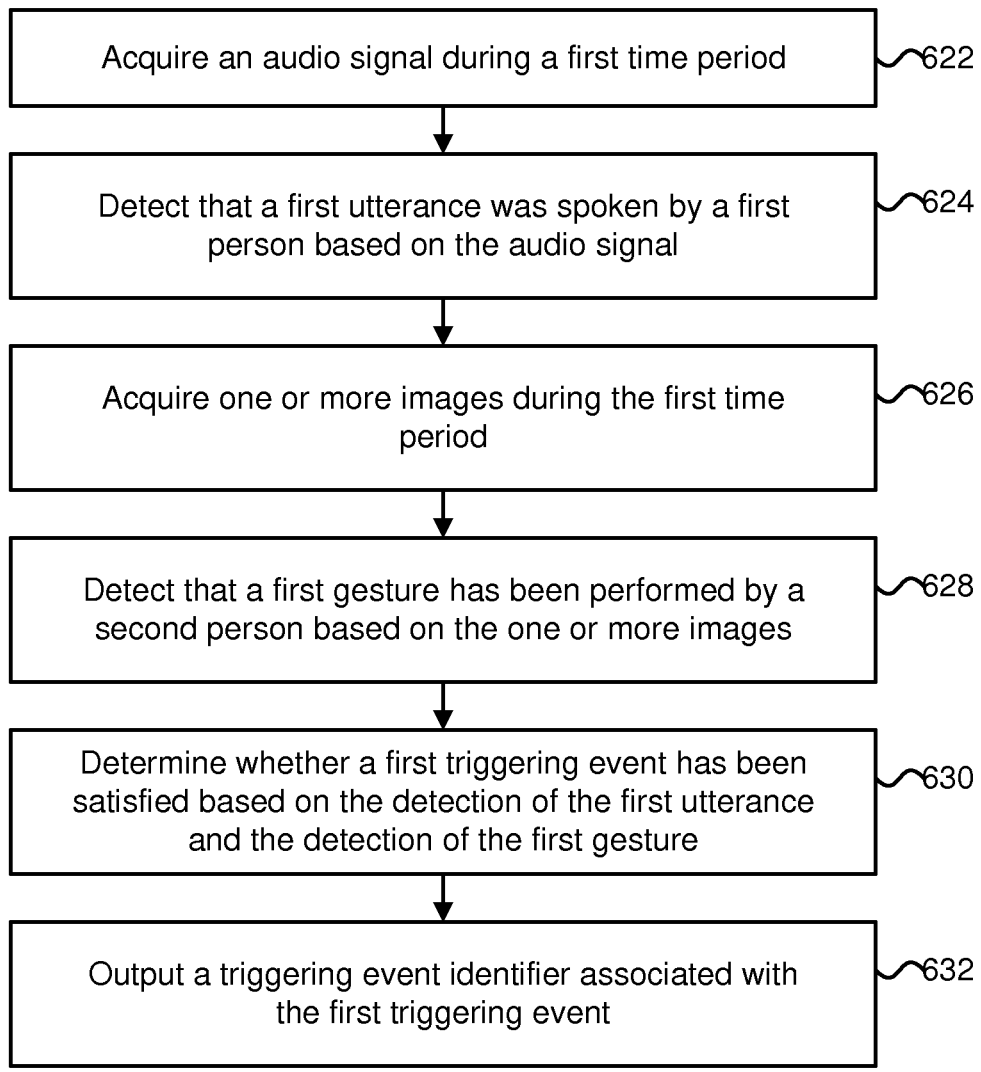
FIG. 6B is a flowchart describing one embodiment of a process for determining whether a triggering event has been satisfied.

FIG. 6B is a flowchart describing one embodiment of a process for determining whether a triggering event has been satisfied. The process described in FIG. 6B is one example of a process for implementing step 528 in FIG. 5B. In one embodiment, the process of FIG. 6B is performed by a mobile device, such as mobile device 19 in FIG. 1.

In step 622, an audio signal is acquired during a first time period. The audio signal may be acquired using a microphone or other audio signal capturing device. The first time period may correspond with an estimated time to complete the reading of a particular word sequence. In one example, the first time comprises ten seconds. In step 624, it is detected that a first utterance was spoken by a first person based on the audio signal. In one embodiment, the first person may comprise a parent of a child. The first utterance may be detected by applying voice recognition and/or speech recognition techniques to the audio signal. In some embodiments, one or more voice models included within a particular user profile associated with an end user of an HMD may be used to filter out comments made by other people not associated with one of the one or more voice models. In the case that there is only a single voice model (e.g., corresponding with a parent's voice), then sounds and/or comments made by a child being read to by the parent will be filtered such that only the sounds made by the parent are used to determine whether the first utterance has been spoken by the parent.

In step 626, one or more images are acquired during the first time period. The one or more images may be acquired using a camera or other image capturing device. In step 628, it is detected that a first gesture has been performed by a second person based on the one or more images. In one embodiment, the second person may comprise a child and the first person may comprise a parent of the child. In step 630, it is determined whether a first triggering event has been satisfied based on the detection of the first utterance and the detection of the first gesture. In one embodiment, the triggering event may be satisfied when a parent reads a particular sequence of words aloud and a child points at or looks at the particular sequence of words displayed on the reading object as the parent reads the particular sequence of words. In another embodiment, the triggering event may be satisfied when a child reads a particular sequence of words aloud and a teacher makes an approving gesture. In step 632, a triggering event identifier associated with the first triggering event is outputted. The triggering event identifier (e.g., a unique numerical identifier) may be used to identify that a particular triggering event has been satisfied.

Figure 6C:
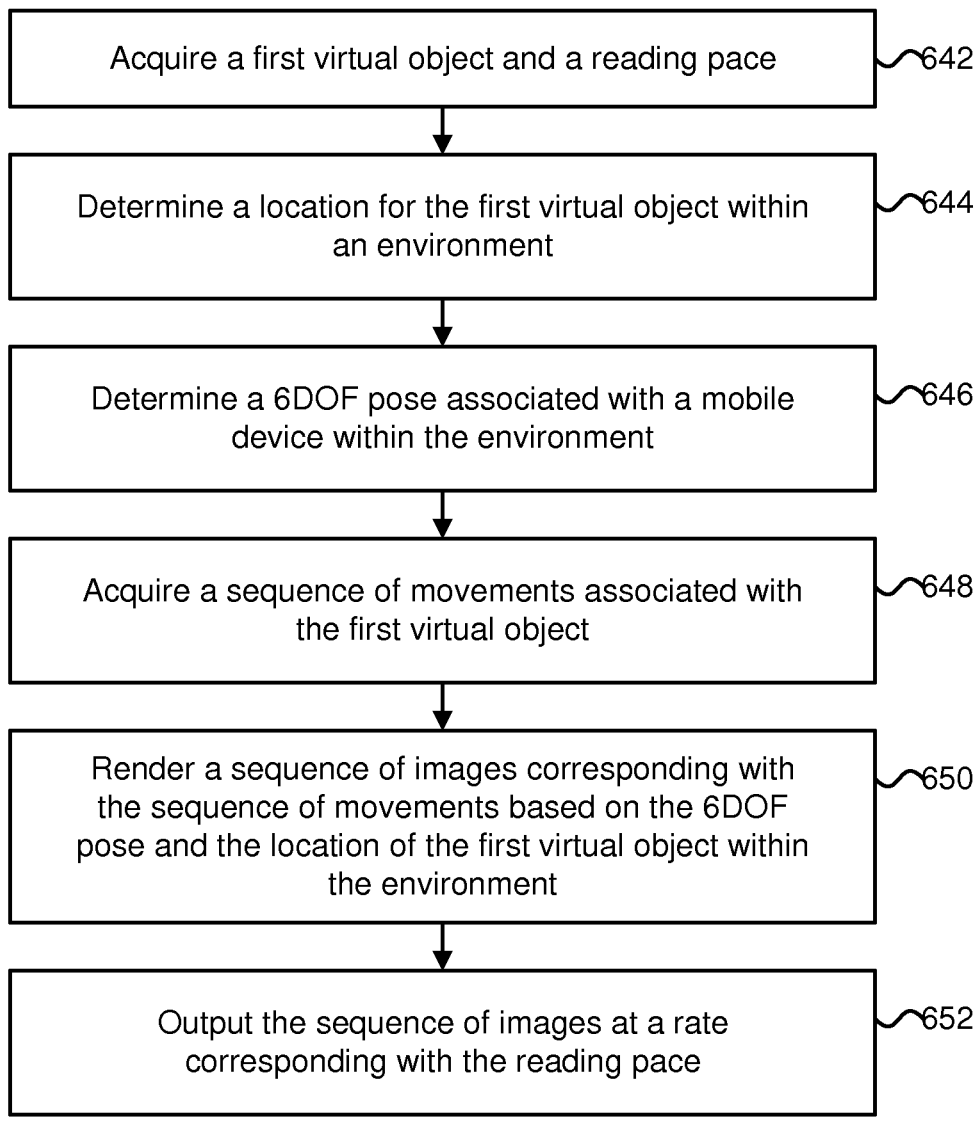
FIG. 6C is a flowchart describing one embodiment of a process for generating a holographic animation.

FIG. 6C is a flowchart describing one embodiment of a process for generating a holographic animation. The process described in FIG. 6C is one example of a process for implementing step 514 in FIG. 5A or for implementing step 534 in FIG. 5B. In one embodiment, the process of FIG. 6C is performed by a mobile device, such as mobile device 19 in FIG. 1.

In step 642, a first virtual object and a reading pace are acquired. In step 644, a location for the first virtual object within an environment is determined. In one embodiment, the location of the first virtual object may be attached to a reading object. In one example, the location of the first virtual object may be based on the location of an AR tag used by the reading object and/or the orientation of the reading object within the environment. In step 646, a six degree of freedom (6DOF) pose associated with a mobile device within the environment is determined. A 6DOF pose may comprise information associated with the position and orientation of the mobile device within the environment. More information regarding determining a 6DOF pose can be found in U.S. patent application Ser. No. 13/152,220, "Distributed Asynchronous Localization and Mapping for Augmented Reality," incorporated herein by reference in its entirety.

In step 648, a sequence of movements associated with the first virtual object are acquired. In one embodiment, the first virtual object may comprise a virtual dragon and the sequence of movements may comprise the virtual dragon mouthing a particular phrase. In another embodiment, the first virtual object may comprise a virtual girl and the sequence of movements may comprise the virtual girl clapping her hands. In step 650, a sequence of images corresponding with the sequence of movements are rendered based on the 6DOF pose and the location of the first virtual object within the environment. In step 652, the sequence of images are outputted at a rate corresponding with the reading pace. In one embodiment, the reading pace for a portion of a story may be used to control the playback speed of a predefined character animation in real-time such that the character is perceived to be lip-synching the story being read aloud.

Figure 6D:
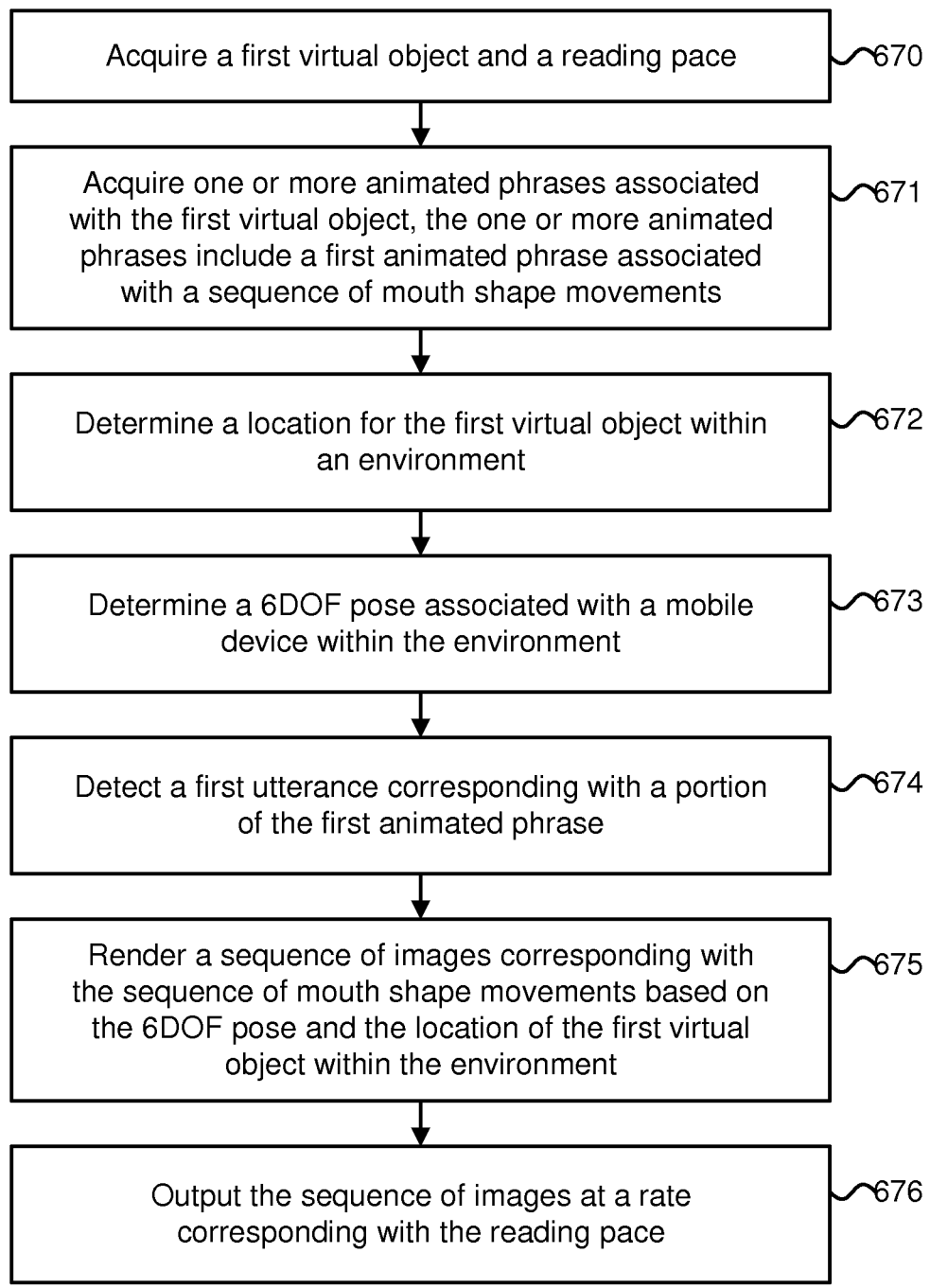
FIG. 6D is a flowchart describing one embodiment of a process for generating a holographic animation.

FIG. 6D is a flowchart describing one embodiment of a process for generating a holographic animation. The process described in FIG. 6D is one example of a process for implementing step 514 in FIG. 5A or for implementing step 534 in FIG. 5B. In one embodiment, the process of FIG. 6D is performed by a mobile device, such as mobile device 19 in FIG. 1.

In step 670, a first virtual object and a reading pace are acquired. In step 671, one or more animated phrases associated with the first virtual object are acquired. The one or more animated phrases may include a first animated phrase associated with a sequence of mouth shape movements. In step 672, a location for the first virtual object within an environment is determined. In one embodiment, the location of the first virtual object may be attached to a reading object. In one example, the location of the first virtual object may be based on the location of an AR tag used by the reading object and/or the orientation of the reading object within the environment. In step 673, a 6DOF pose associated with a mobile device within the environment is determined. In step 674, a first utterance corresponding with a portion of the first animated phrase is detected. The first utterance may be detected via voice recognition and/or audio recognition techniques. In step 675, a sequence of images corresponding with the sequence of mouth shape movements are rendered based on the 6DOF pose and the location of the virtual object within the environment. In step 676, the sequence of images are outputted at a rate corresponding with the reading pace.

Figure 7A:
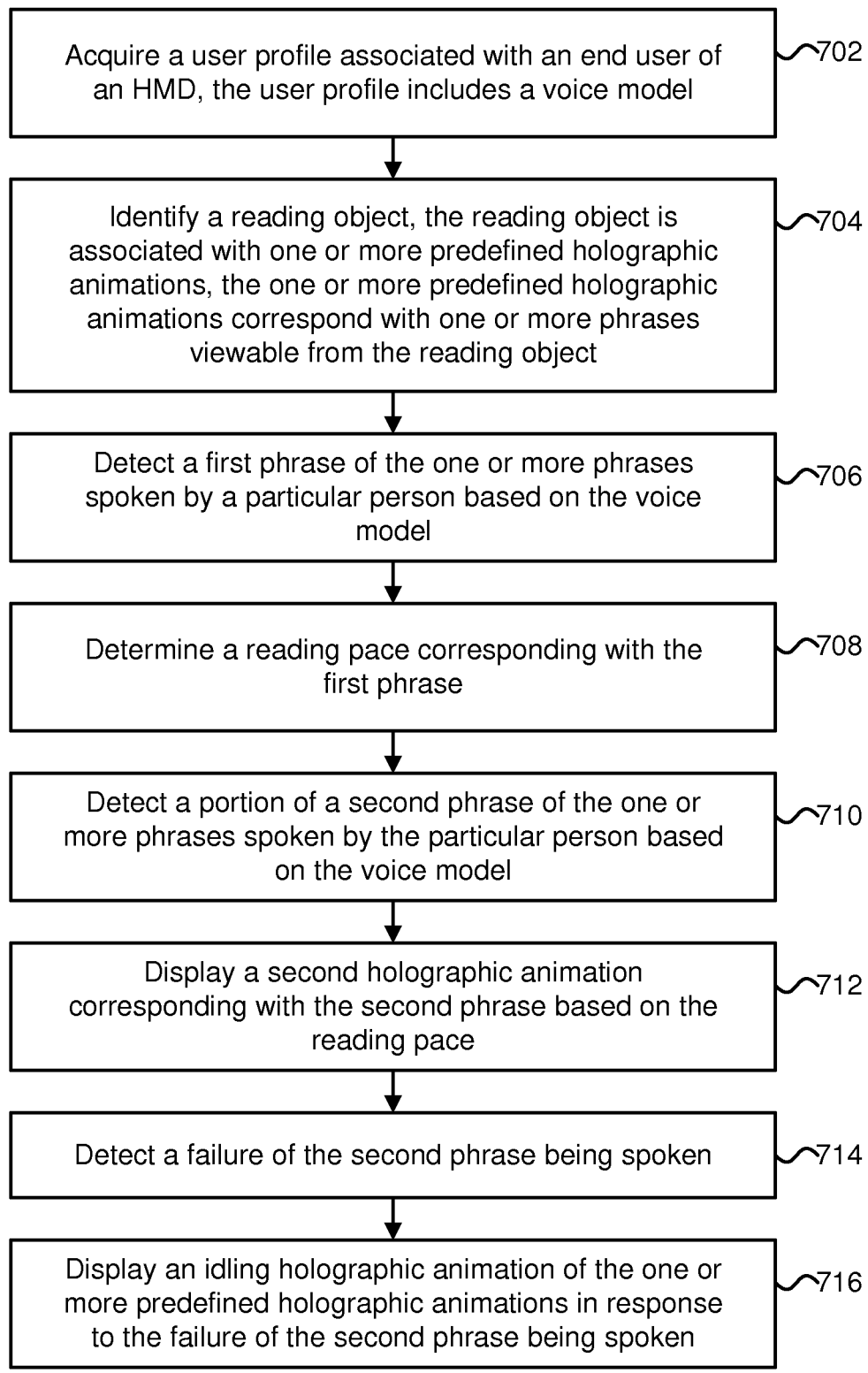
FIG. 7A is a flowchart describing one embodiment of a method for synchronizing holographic animations to one or more phrases in a story.

FIG. 7A is a flowchart describing one embodiment of a method for synchronizing holographic animations to one or more phrases in a story. In one embodiment, the process of FIG. 7A is performed by a mobile device, such as mobile device 19 in FIG. 1.

In step 702, a user profile associated with an end user of an HMD is acquired. The user profile may include a voice model. The voice model may be used to identify a particular voice corresponding with a particular person. For example, the voice model may be used to identify when a particular parent of particular child is speaking. In step 704, a reading object is identified. In one embodiment, the reading object may be identified using image recognition techniques. The reading object may be associated with one or more predefined holographic animations. The one or more predefined holographic animations may correspond with one or more phrases viewable from the reading object. In one example, each of the one or more predefined holographic animations may correspond with a sentence in a story viewable from the reading object.

In step 706, a first phrase of the one or more phrases spoken by a particular person is detected based on the voice model. The particular person may comprise a particular child. In one embodiment, the first phrase may be detected using voice recognition and/or speech recognition techniques. In one embodiment, the first phrase will be deemed to have been spoken by the particular person if a speech recognition engine determines that the first phrase has been spoken with at least a particular degree of confidence. In some cases, the particular person need not speak every word in the first phrase in order for the first phrase to be detected as long as the particular degree of confidence is satisfied.

In step 708, a reading pace corresponding with the first phrase detected in step 706 is determined. The reading pace may comprise a speed at which the particular person has spoken the first phrase. In some embodiments, previous phrases spoken by the particular person that were interrupted (e.g., a child interrupting a parent telling a story) or otherwise timed out due to a failure to correctly speak a previous phrase may be discarded from the reading pace determination. In step 710, a portion of a second phrase of the one or more phrases spoken by the particular person is detected based on the voice model. The portion of the second phrase may comprise one or more keywords of the second phrase. In one example, the portion of the second phrase may comprise the first three words of a sentence comprising the second phrase.

In step 712, a second holographic animation is displayed corresponding with the second phrase based on the reading pace determined in step 708. In this case, the entire holographic animation corresponding with the entire second phrase is outputted even though the entire second phrase has not been detected. In step 714, a failure of the second phrase being spoken is detected. The failure of the second phrase being spoken may comprise a pause in the second phrase being spoken for longer than a predetermined amount of time. The failure of the second phrase being spoken may also comprise a failure of the particular person to pronounce or speak the entire second phrase within an error of margin. For example, if the second phrase comprises a sentence with ten words and the particular person fails to speak eight of the ten words correctly, then a failure of the second phrase being spoken may be detected. In step 716, an idling holographic animation of the one or more predefined holographic animations is displayed in response to the failure of the second phrase being spoken.

Figure 7B:
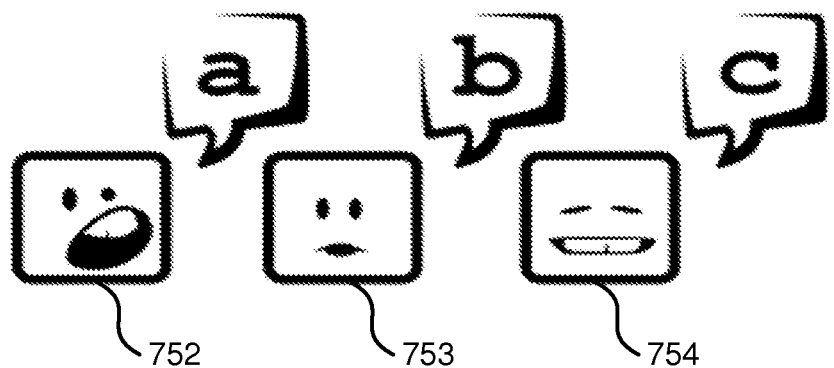
FIGS. 7B and 7C depict one embodiment of a synchronized playback of three predefined holographic animations based on the detection of utterances from a particular person.
Figure 7C:
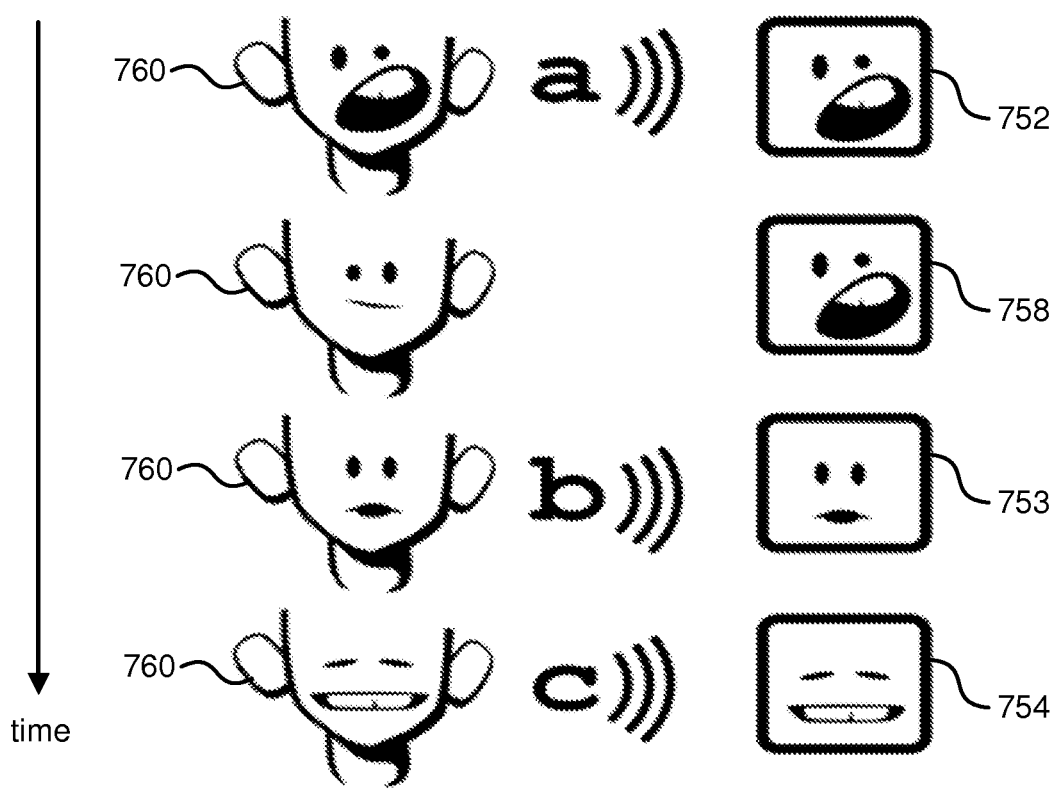

FIGS. 7B and 7C depict one embodiment of a synchronized playback of three predefined holographic animations 752-754 based on the detection of utterances from a particular person 760. As depicted in FIG. 7B, a first holographic animation 752 corresponds with a first sequence of one or more mouth shapes associated with a first phrase "a," a second holographic animation 753 corresponds with a second sequence of one or more mouth shapes associated with a second phrase "b," and a third holographic animation 754 corresponds with a third sequence of one or more mouth shapes associated with a third phrase "c." In some embodiments, a phrase may be composed of one or more phonemes each corresponding with a different mouth shape. For example, the word "that," when spoken, may be divided into three different phonemes: a phoneme for "th," a phoneme for "a," and a phoneme for "t."

As depicted in FIG. 7C, as particular person 760 speaks a first portion of the first phrase, the first holographic animation 752 is displayed. Thereafter, when particular person 760 is silent for more than a particular time duration or fails to correctly speak the entire first phrase, an idling holographic animation 758 is displayed. Thereafter, as particular person 760 speaks a first portion of the second phrase, the second holographic animation 753 is displayed. Subsequently, as particular person 760 speaks a first portion of the third phrase, the third holographic animation 754 is displayed.

One embodiment of the disclosed technology includes identifying a reading object within a reading distance of a mobile device and acquiring a first virtual object associated with the reading object. The first virtual object is associated with a first triggering event. The method further includes detecting a portion of the reading object being read by an end user of the mobile device, determining whether the first triggering event has been satisfied based on the detecting a portion of the reading object being read, determining a reading pace associated with the portion of the reading object read by the end user in response to the first triggering event being satisfied, generating a holographic animation associated with the first virtual object based on the reading pace, and displaying at the mobile device the holographic animation.

One embodiment of the disclosed technology includes acquiring a user profile associated with an end user of a mobile device. The user profile includes a virtual object viewing history. The method further includes identifying a reading object within a viewing distance of the mobile device and acquiring one or more virtual objects associated with the reading object. The one or more virtual objects include a first set of virtual objects associated with a first triggering event. The method further includes detecting a first utterance spoken by a particular person reading from the reading object, determining whether the first triggering event has been satisfied based on the detecting a first utterance, determining a reading pace associated with the first utterance in response to the first triggering event being satisfied, determining a first virtual object of the first set of virtual objects based on the virtual object viewing history, generating a holographic animation associated with the first virtual object based on the reading pace, and displaying at the mobile device the holographic animation.

One embodiment of the disclosed technology includes a memory, one or more processors, and a see-through display. The memory stores a first virtual object associated with a reading object. The first virtual object is associated with a first triggering event. The one or more processors identify the reading object within a reading distance of the electronic device, detect a portion of the reading object being read by an end user of the electronic device, determine whether the first triggering event has been satisfied in response to detecting the portion of the reading object being read by the end user, determine a reading pace associated with the portion of the reading object read by the end user, and generate a holographic animation associated with the first virtual object based on the reading pace. The see-through display displays the holographic animation.

One embodiment of the disclosed technology includes identifying a reading object at a mobile device. The reading object is associated with one or more holographic animations corresponding with one or more phrases viewable from the reading object. The method further includes detecting at the mobile device that a first phrase of the one or more phrases has been spoken by a particular person, determining a reading pace corresponding with the first phrase, detecting at the mobile device that a portion of a second phrase of the one or more phrases has been spoken by the particular person, and displaying at the mobile device a second holographic animation corresponding with the second phrase based on the reading pace.

One embodiment of the disclosed technology includes acquiring a user profile associated with an end user of a mobile device. The user profile includes a voice model corresponding with a particular person. The method further includes identifying a reading object. The reading object is associated with one or more holographic animations corresponding with one or more phrases associated with the reading object. The method further includes detecting a first phrase of the one or more phrases spoken by the particular person based on the voice model, determining a reading pace corresponding with the first phrase, detecting a portion of a second phrase of the one or more phrases spoken by the particular person based on the voice model, and displaying at the mobile device a second holographic animation corresponding with the second phrase based on the reading pace.

One embodiment of the disclosed technology includes a memory, one or more processors, and a see-through display. The memory stores a voice model. The one or more processors identify a reading object. The reading object is associated with one or more holographic animations corresponding with one or more phrases viewable from the reading object. The one or more processors detect a first phrase of the one or more phrases using the voice model, determine a reading pace corresponding with the first phrase, detect a portion of a second phrase of the one or more phrases using the voice model, and generate a second holographic animation corresponding with the second phrase based on the reading pace. The see-through display displays the second holographic animation.

Figure 8:
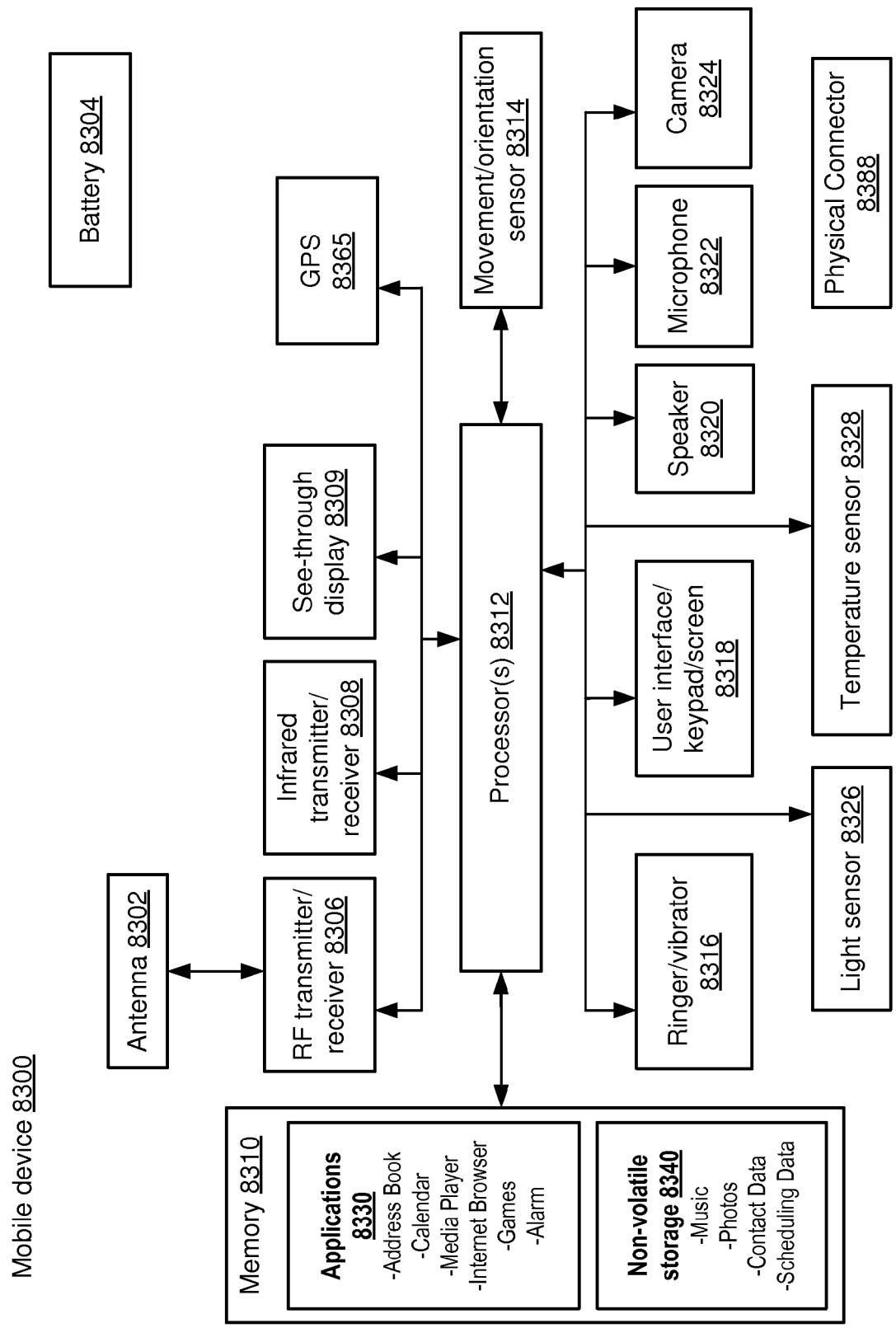
FIG. 8 is a block diagram of one embodiment of a mobile device.

FIG. 8 is a block diagram of one embodiment of a mobile device 8300, such as mobile device 19 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a microelectromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for synchronizing performance of a virtual object to performance of a person, comprising:
capturing a first audio signal associated with sounds made by the person during a first time period;
detecting that a first utterance has been spoken by the person using the captured first audio signal;
determining a speed at which the person spoke the first utterance;
capturing a second audio signal associated with sounds made by the person during a second time period subsequent to the first time period;
detecting that a portion of a second utterance has been spoken by the person using the captured second audio signal; and
displaying, using a display, a sequence of images of the virtual object at a rate corresponding with the determined speed of the first utterance in response to detecting that the portion of the second utterance has been spoken by the person, the sequence of images including a sequence of mouth shape images displayed such that the virtual object appears to speak the second utterance at the determined speed of the first utterance.

2. The method of claim 1, wherein:
the capturing a first audio signal includes capturing the first audio signal using a microphone; and
the detecting that a first utterance has been spoken by the person is performed by a mobile device, the detecting that a first utterance has been spoken by the person includes applying speech recognition techniques to the captured first audio signal; and
the displaying a sequence of images of the virtual object includes displaying the sequence of images using the mobile device.

3. The method of claim 2, wherein:
the mobile device comprises a head-mounted display device.

4. The method of claim 2, further comprising:
identifying a reading object within a field of view of the mobile device, the first utterance corresponds with a first sentence from the reading object.

5. The method of claim 4, wherein:
the reading object comprises a book.

6. The method of claim 4, wherein:
the second utterance comprises a second sentence from the reading object that is spoken by the person.

7. The method of claim 4, further comprising:
detecting a page of the reading object within the field of view of the mobile device;
identifying the virtual object based on the page of the reading object; and
the displaying the sequence of images includes displaying the sequence of images such that the virtual object appears to be attached to the reading object.

8. The method of claim 1, wherein:
the displaying a sequence of images of the virtual object includes displaying the sequence of mouth shape images prior to the second utterance being completely spoken by the person.

9. The method of claim 1, further comprising:
detecting a failure of the second utterance being completely spoken by the person; and
displaying an idling holographic animation in response to detecting the failure of the second phrase being completely spoken by the person.

10. The method of claim 1, wherein:
the detecting that a portion of a second utterance has been spoken by the person includes detecting a sequence of keywords corresponding with the portion of the second utterance.

11. The method of claim 1, wherein:
the determining a speed at which the person spoke the first utterance includes determining an amount of time that the person took to speak a plurality of words corresponding with the first utterance.

12. The method of claim 2, wherein:
the mobile device comprises a see-through head-mounted display device worn by a first person different from the person.

13. An electronic device for synchronizing performance of a virtual object to performance of a person, comprising:
one or more processors, the one or more processors detect that a first utterance has been spoken by a person and determine a speed at which the person spoke the first utterance, the one or more processors detect that a portion of a second utterance has been spoken by the person and generate a sequence of images of the virtual object in response to detecting that the portion of the second utterance has been spoken by the person; and
a see-through display in communication with the one or more processors, the see-through display displays the sequence of images of the virtual object at a rate corresponding with the speed of the first utterance, the sequence of images including a sequence of mouth shape images that are displayed using the see-through display such that the virtual object appears to speak the second utterance at the speed of the first utterance.

14. The electronic device of claim 13, wherein:
the electronic device comprises a head-mounted display device.

15. The electronic device of claim 13, wherein:
the one or more processors identify a reading object within a field of view of the electronic device, the second utterance comprises a second sentence from the reading object that is spoken by the person.

16. The electronic device of claim 15, wherein:
the reading object comprises a book.

17. The electronic device of claim 13, wherein:
the see-through display displays the sequence of mouth shape images prior to the second utterance being completely spoken by the person.

18. One or more hardware storage devices containing processor readable code for programming one or more processors to perform a method for synchronizing performance of a virtual object to performance of a person, the processor readable code comprising:
processor readable code configured to detect that a first utterance has been spoken by the person;
processor readable code configured to determine a speed at which the person spoke the first utterance;
processor readable code configured to detect that a portion of a second utterance has been spoken by the person; and
processor readable code configured to cause a sequence of images of the virtual object to be displayed at a rate corresponding with the speed of the first utterance subsequent to detecting that the portion of the second utterance has been spoken by the person, the sequence of images including a sequence of mouth shape images that are displayed such that the virtual object appears to speak the second utterance at the speed of the first utterance.

19. The one or more hardware storage devices of claim 18, wherein the processor readable code further comprises:
processor readable code configured to detect that the first utterance has been spoken using a head-mounted display device; and
processor readable code configured to cause the sequence of images of the virtual object to be displayed using a display of the head-mounted display device.

20. The one or more hardware storage devices of claim 19, wherein the processor readable code further comprises:
processor readable code configured to cause the sequence of images of the virtual object to be displayed using the display of the head-mounted display device such that the sequence of mouth shape images are displayed prior to the second utterance being completely spoken by the person.

* * * * *